(12) United States Patent
Bernabe et al.

(10) Patent No.: US 12,549,398 B1
(45) Date of Patent: Feb. 10, 2026

(54) SERVER-BASED DYNAMIC SELECTION OF PARTICIPANTS IN A LIVE SESSION

(71) Applicant: Zoom Communications, Inc., San Jose, CA (US)

(72) Inventors: William Thomas Bernabe, Northborough, MA (US); Benjamin Joseph DeStephen, Hilliard, OH (US); Michael Richard Williams, Brooklyn Park, MN (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/484,075

(22) Filed: Oct. 10, 2023

(51) Int. Cl.
*H04L 65/4038* (2022.01)
*H04L 12/18* (2006.01)

(52) U.S. Cl.
CPC ...... *H04L 12/1822* (2013.01); *H04L 65/4038* (2013.01)

(58) Field of Classification Search
CPC ... H04L 12/1822; H04L 65/40; H04L 65/403; H04L 65/4038; H04L 65/4046; H04L 65/4053; H04N 7/15
See application file for complete search history.

(56) References Cited

U.S. PATENT DOCUMENTS

| | | | |
|---|---|---|---|
| 8,971,511 B2 | 3/2015 | Shaffer et al. | |
| 9,077,849 B2 | 7/2015 | Meek | |
| 11,271,765 B2 | 3/2022 | Bujnowski et al. | |
| 11,417,229 B2 | 8/2022 | Dawson et al. | |
| 11,562,657 B1 * | 1/2023 | Fieldman | G09B 5/14 |
| 11,706,269 B1 | 7/2023 | Hassan et al. | |
| 11,956,286 B1 | 4/2024 | Hassan et al. | |
| 2007/0263821 A1 * | 11/2007 | Shaffer | H04M 3/42187 |
| | | | 379/202.01 |
| 2013/0070045 A1 * | 3/2013 | Meek | H04L 65/4038 |
| | | | 348/E7.083 |
| 2014/0074471 A1 | 3/2014 | Sankar et al. | |
| 2016/0255126 A1 * | 9/2016 | Sarris | H04L 65/1096 |
| | | | 348/14.08 |
| 2016/0285921 A1 * | 9/2016 | Savostiyanov | H04L 65/1093 |
| 2017/0353508 A1 | 12/2017 | Yoakum | |
| 2018/0113913 A1 * | 4/2018 | Lee | H04L 51/216 |
| 2018/0176377 A1 | 6/2018 | Liebisch et al. | |
| 2018/0255114 A1 * | 9/2018 | Dharmaji | G06F 16/435 |
| 2018/0375676 A1 | 12/2018 | Bader-Natal et al. | |
| 2019/0124128 A1 * | 4/2019 | Bader-Natal | G06Q 10/101 |
| 2019/0173926 A1 * | 6/2019 | Lal | H04L 65/1069 |
| 2020/0294640 A1 * | 9/2020 | Ginsburg | G16H 40/20 |

(Continued)

*Primary Examiner* — Johnny B Aguiar
(74) *Attorney, Agent, or Firm* — Young Basile Hanlon & MacFarlane, P.C.

(57) ABSTRACT

Dynamic selection of participants in video conference where a host of a live session can select a list of participants and a rule for selecting participants therefrom, causing video conferencing services to iteratively apply the rule to the list to select participants for active engagement in the live session. The host can select multiple lists to generate combined lists using set operators such as union, intersection, and difference. The host can modify parameters of parameterized rules. A console may be presented by a user interface of a client device of the host, where the host can select and combine lists, and select and modify rules. The console may present a queue of selected participants.

18 Claims, 13 Drawing Sheets

(56) References Cited

U.S. PATENT DOCUMENTS

| | | | |
|---|---|---|---|
| 2022/0182428 A1* | 6/2022 | Roedel | G06Q 10/063114 |
| 2022/0236838 A1 | 7/2022 | Park | |
| 2022/0391851 A1 | 12/2022 | Panikkar et al. | |
| 2022/0400022 A1 | 12/2022 | Desai et al. | |
| 2023/0208898 A1* | 6/2023 | Deng | G06Q 10/06393 |
| | | | 709/204 |
| 2023/0247069 A1 | 8/2023 | Khire et al. | |
| 2023/0396826 A1* | 12/2023 | Apurvi | H04N 21/2187 |
| 2024/0087177 A1 | 3/2024 | Liu et al. | |
| 2024/0153268 A1 | 5/2024 | Fujisaki et al. | |
| 2024/0313990 A1 | 9/2024 | Li et al. | |
| 2025/0030567 A1 | 1/2025 | Wang et al. | |
| 2025/0132940 A1 | 4/2025 | Heinlein et al. | |

\* cited by examiner

SERVER-BASED DYNAMIC SELECTION OF PARTICIPANTS IN A LIVE SESSION

FIELD

This disclosure generally relates to video conferencing, and, more specifically, to dynamic selection of participants for active engagement in a live session of a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
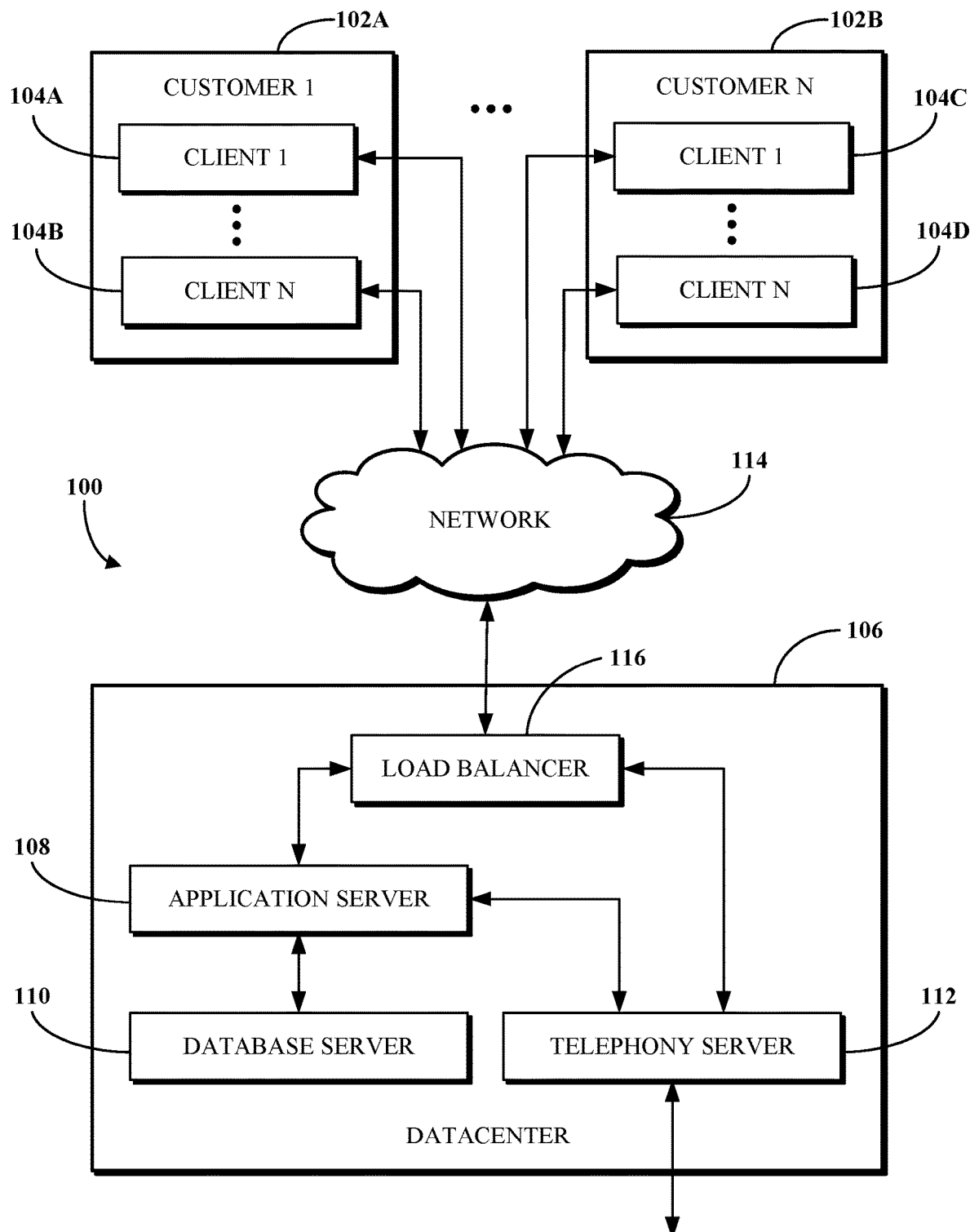
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

During a live session of a group video conference, a host may, from time to time, seek active engagement of an individual participant selected from among the group of participants, e.g., to answer a question posed to the group. The host may find it difficult or disruptive to select the individual participant by manually asking for volunteers or calling on specific participants. For example, no participants may want to engage; too many participants may want to engage; there may be several participants with a same name, and so on. Further, the host's manual selection processes may exhibit undesirable characteristics, for example: biased selection, non-random selection, repetitive selection, scarce selection, and so on. Conventional conferencing systems provide user experience features that a host can use to support his manual selection processes; however, these user experience features lack technical capability to enable dynamic participant selection in a manner that actually resolves these issues.

Implementations of this disclosure address issues such as these by providing a simplified and/or enhanced process for selecting an individual participant for active engagement in a live session of a group video conference. In some implementations, the selection can be accomplished with minimal input from the host during the live session, such that the selection process is partially automated. For example, the host's video conference interface may provide a console having an input field that, when activated by the host, automatically selects an individual participant from a list of participants according to a selected (or default) rule. As a simple example, the host may choose a list of participants that includes all of the participants in the video conference, and the host may choose a selection rule that randomly selects an individual participant from the list. The conferencing system may then notify the individual participant that he has been selected; the conferencing system may highlight the individual participant's tile for others in the video conference to see; and the conferencing system may automatically unmute the individual participant. In another implementation, the host may choose a list of participants that includes a subset of all participants, for example, only those who are currently activating a "hand-raised" feature of the conferencing system, and the host may choose a "least-talkative first" selection rule that selects an individual participant from the list who has had the least amount of active engagement (e.g., speaking) during the current and/or a predetermined quantity of previous live sessions ("least-talkative first" may be referred to herein as simply "least talkative"). The host's console may provide input fields for choosing one or more lists and for choosing a rule to apply to the one or more lists. The console may provide input fields for indicating how to combine multiple lists; input fields for activating, or applying, the chosen rule to the chosen list(s); input fields for pausing or terminating the selection process, and so on.

Data, including participant-selection history and participant active-engagement history, may be collected during live sessions and processed in real time (e.g., during the live session) to create or modify lists for use contemporaneously (i.e., during the live session) or later (i.e., during a subsequent live session). The term "list" is used herein to describe a set, and in some cases, to describe an ordered set. Thus, lists can be operated on using set-theory mathematics, and specifically, set operators. Set operators include, without limitation, intersection (∩), union (∪), and difference (−). For example, the intersection of two lists, B and C, can be represented mathematically as A=B∩C, where the members of A are the common members between B and C. As another example, the union of lists B and C can be represented as A=B∪C, where the members of A are all members of both B and C. As another example, the difference between two lists, B and C, can be represented as A=B−C, where the members of A are the members of B that are left after removing from B the members of B n C. Set operators can be compounded, e.g., A=B∪C-D, according to set-theory order of operations. Operations on ordered lists may be handled in a suitable manner, for example, given ordered lists M={m1, m2, m3} and N={n1, n2}, L=M∪N may be determined by: (1) concatenating one list with the other, e.g., L={m1, m2, m3, n1, n2}; (2) round-robin selecting members from each list, e.g., L={m1, n1, m2, n2, m3}; and so on. While all set theory operations are within the scope of the invention, the union operator is the most practical for purposes of a streamlined user experience, and therefore, in many implementations, the union operator may be a default or implicit operator when a host selects multiple lists. Lists may be created, manipulated, curated, and otherwise managed by a video conferencing system, by a third-party application, or manually.

To describe some implementations in greater detail, reference is first made to examples of hardware and software structures used to implement a system for dynamic selection of participants for active engagement in a live session. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include one or more customers and/or clients, and it can include a configuration of customers or clients different from that generally illustrated in FIG. 1. For example, and without limitation, the system 100 can include hundreds or thousands of customers, and at least some of the customers can include or be associated with one or more clients.

The system 100 includes a datacenter 106, which may include one or more servers. The datacenter 106 can represent a geographic location, which can include a facility, where the one or more servers are located. The system 100 can include one or more datacenters and servers, and it can include a configuration of datacenters and servers different from that generally illustrated in FIG. 1. For example, and without limitation, the system 100 can include tens of datacenters, and at least some of the datacenters can include hundreds or thousands of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable quantity of each of the servers 108 through 112 can be implemented at the datacenter 106. The UCaaS platform can use a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, or the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed to deliver software services to a client, such as one of the clients 104A through 104D, as part of a software application. The application node can be implemented using processing threads, virtual machine instantiations, or other computing features of the application server 108. In some such implementations, the application server 108 can include a suitable quantity of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104A, the client 104B, the client 104C, the client 104D, or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired (e.g., electrical or optical), wireless (e.g., electromagnetic, optical), use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
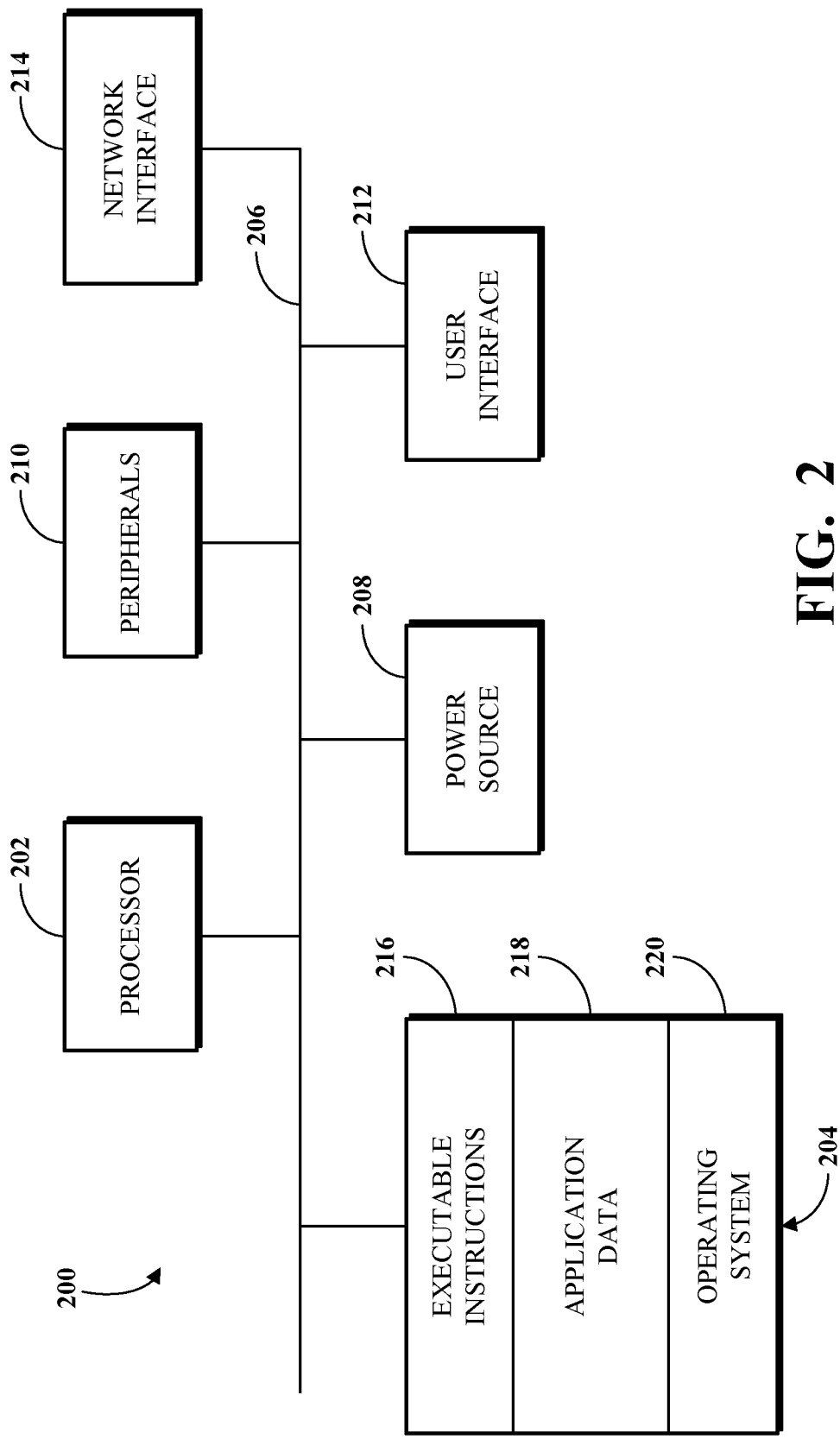
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104A, the client 104B, the client 104C, the client 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a dynamic RAM (DRAM) module, such as double data rate (DDR) synchronous DRAM (SDRAM)). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an Institute of Electrical and Electronics Engineers (IEEE) 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
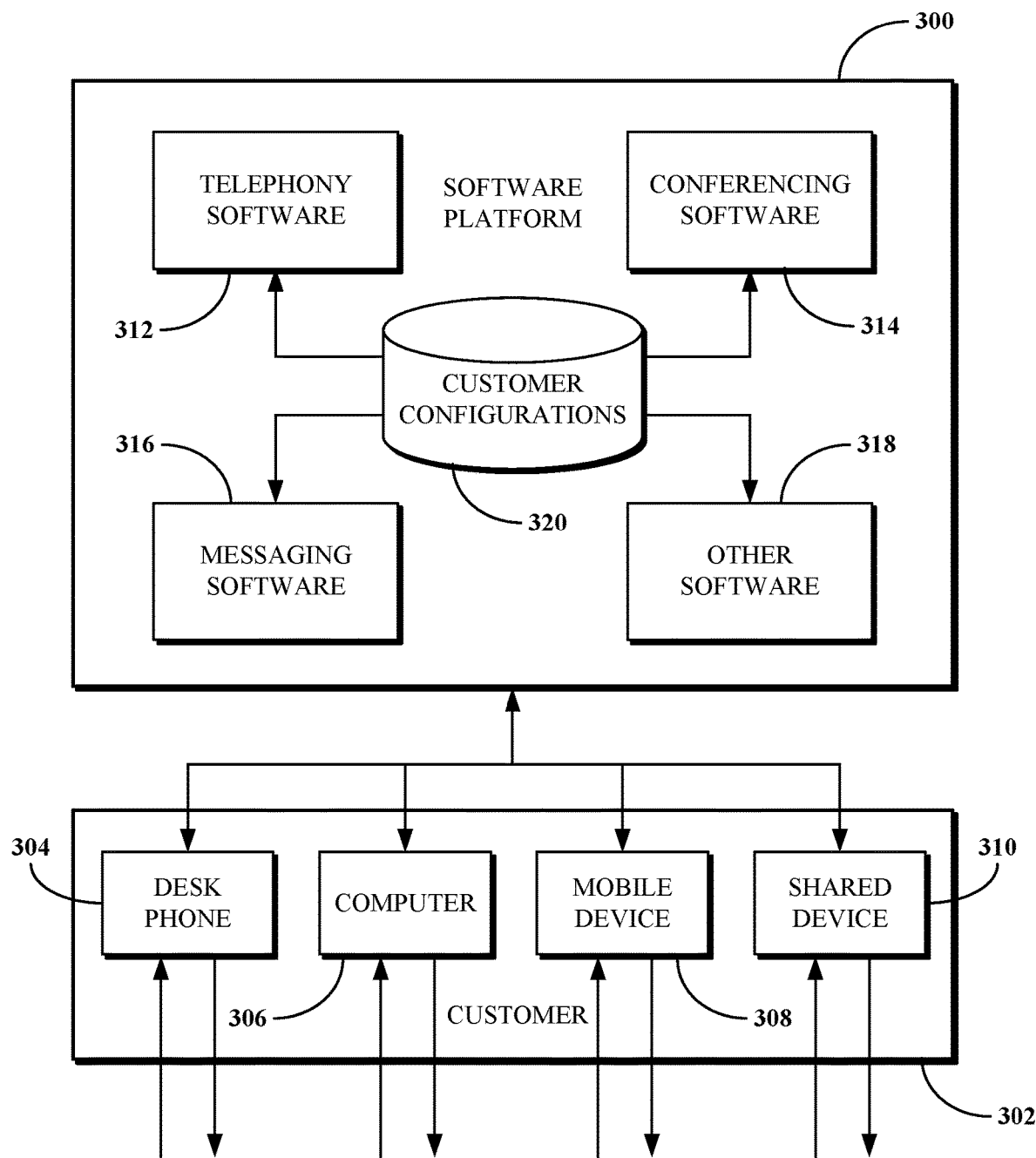
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, or the telephony server 112 of the datacenter 106 shown in FIG. 1.

The software platform 300 includes software services accessible using one or more clients. For example, a customer 302 as shown includes four clients: a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the desk phone 304, the computer 306, the mobile device 308, and the shared device 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the desk phone 304, the computer 306, the mobile device 308, the shared device 310 and other telephony-enabled devices, which may be other ones of the desk phone 304, the computer 306, the mobile device 308, the shared device 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which case the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300.

Examples of the other software 318 include, but are not limited to, device management software, resource provisioning and deployment software, administrative software, third party integration software, application programming interfaces (APIs), and the like. In one particular example, the other software 318 can include software that implements efficient set operations on lists (i.e., operations on sets or ordered sets), such as union, intersection, and difference, and software that implements efficient sorting and filtering of lists and searching for elements within lists. For example, the other software 318 can be software for dynamic selection of participants. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user-interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the desk phone 304, the computer 306, the mobile device 308, and the shared device 310. Terms "run" and "execute" as used herein with reference to software may be synonymous.

Figure 4:
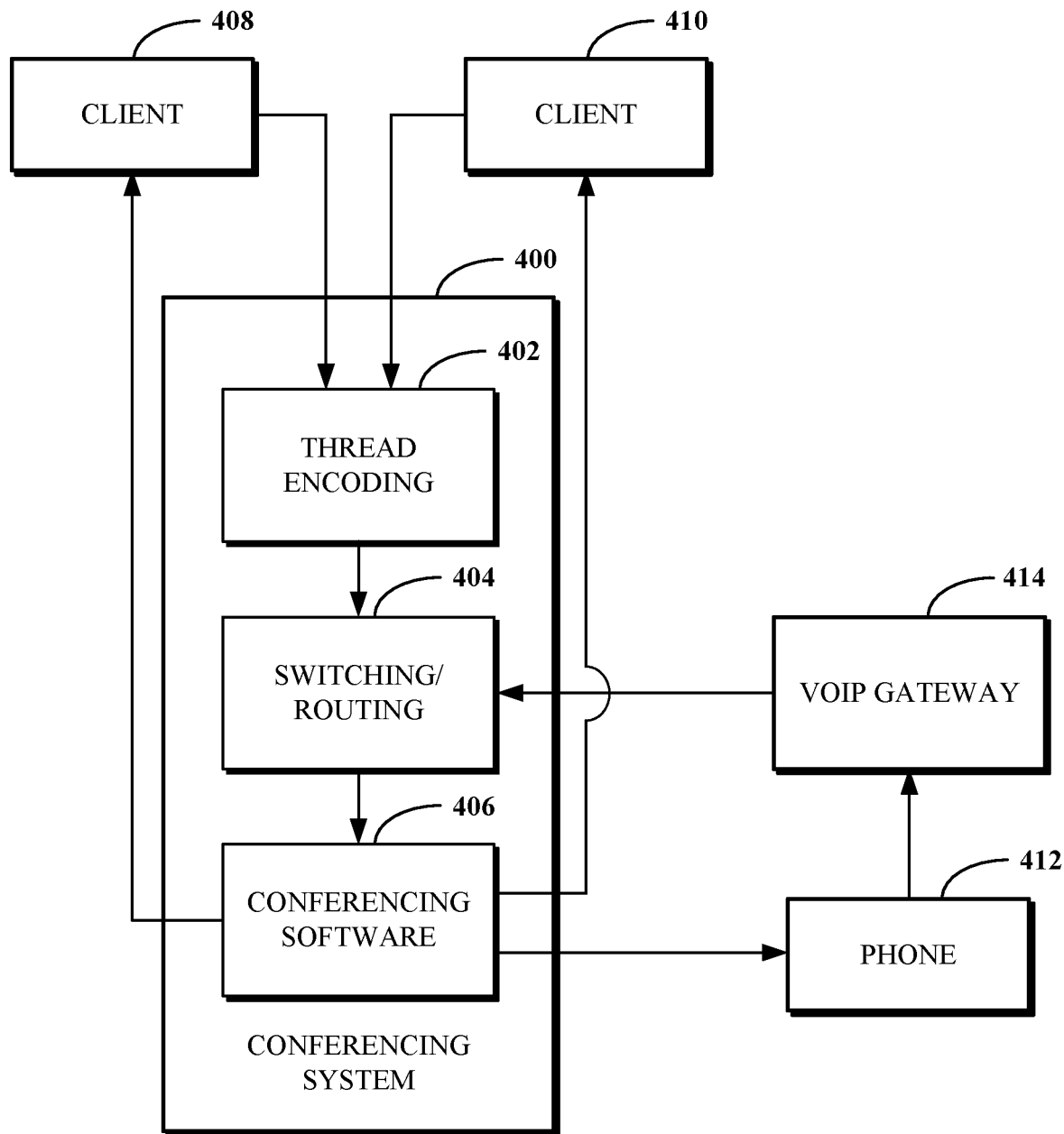
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may be, for example, the conferencing software 314 shown in FIG. 3, is software for implementing conferences (e.g., video conferences) between users of clients and/or phones, such as a client device 408, a client device 410, and phone 412. For example, the client device 408 or the client device 410 may each be one of the desk phone 304, the computer 306, the mobile device 308, or the shared device 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other quantities of clients and/or other quantities of phones can connect to the conferencing system 400.

Implementing a conference includes transmitting and receiving video, audio, and/or other data between clients and/or phones, as applicable, of the conference participants. Each of the client device 408, the client device 410, and the phone 412 may connect through the conferencing system 400 using separate input streams to enable users thereof to participate in a conference together using the conferencing software 406. The various channels used for establishing connections between the client devices 408 and 410 and the phone 412 may, for example, be based on the individual device capabilities of the client devices 408 and 410 and the phone 412.

The conferencing software 406 includes a user interface tile for each input stream received and processed at the conferencing system 400. A "user interface tile," or "tile" for short, as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and/or arranged in a center position of the conferencing software user interface while the user interface tiles for other conference participants are reduced in size and/or arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client device 408 or the client device 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant accesses the conferencing software 406 from a phone, such as the phone 412, the user interface tile for the participant may be limited to a static image showing text (e.g., a name, telephone number, or other identifier associated with the participant or the phone 412) or other default background aspects since there is no video stream presented for that participant.

The thread encoding tool 402 receives video streams separately from the client device 408 and the client device 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the client device 408 and the client device 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining via clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
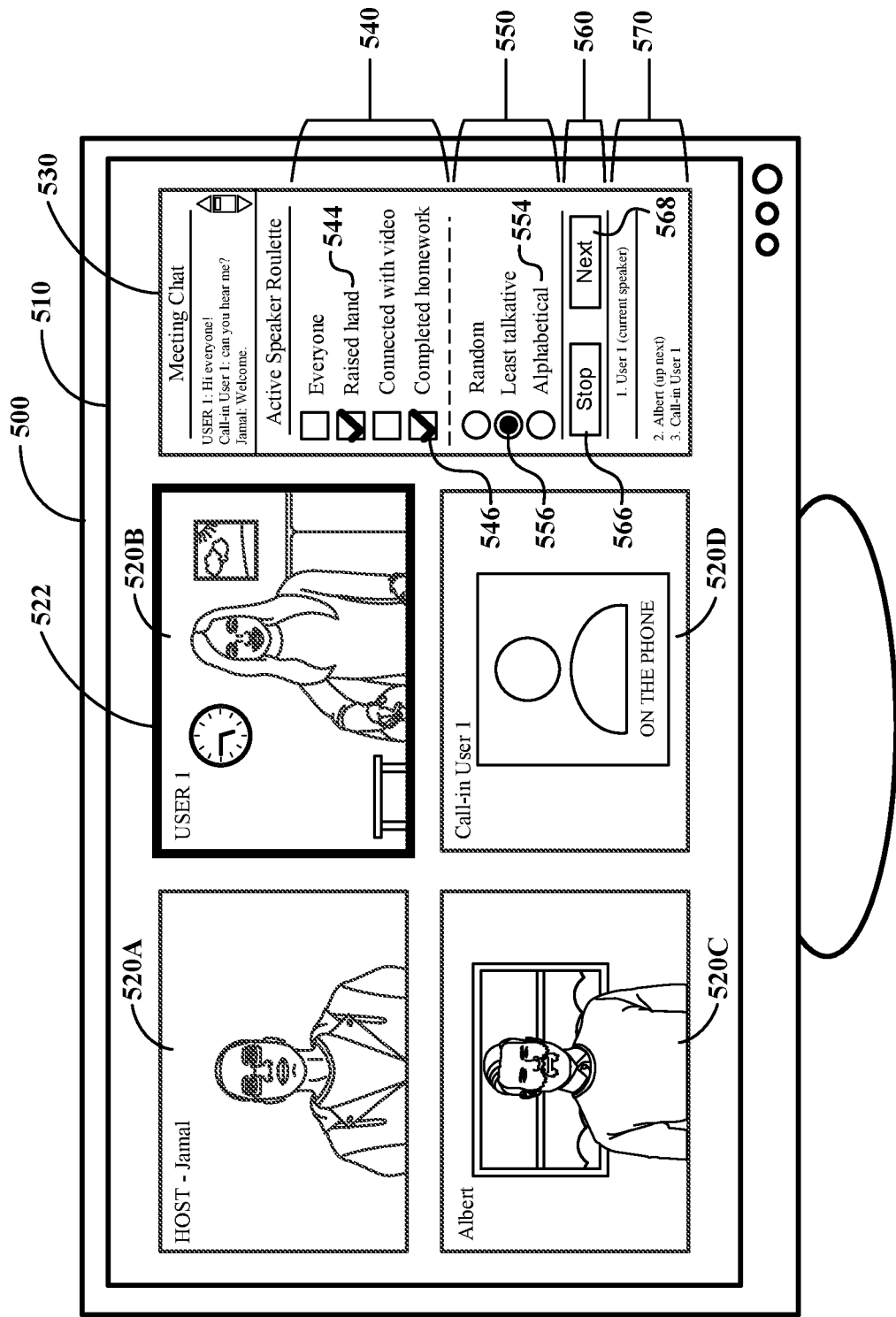
FIG. 5 is an example of a video conference interface that may be presented to a host during a live session.

FIG. 5 is an example of a video conference interface that may be presented to a host during a live session. The host may be a user or operator of a client device, for example, the computer 306, the mobile device 308, or the shared device 310 of FIG. 3. The display 500 of FIG. 5 comprises a graphical interface 510 and may be implemented by the user interface 212 of FIG. 2. The video conference may, for example, be provided by software services of a UCaaS platform implemented by the application server 108 of FIG. 1 (e.g., the software platform 300 of FIG. 3). Four tiles 520A, 520B, 520C, and 520D are displayed by the graphical interface 510, where tiles 520A-520C correspond to participants who have joined the live session via video-enabled client devices (e.g., the client device 408 and the client device 410 of FIG. 4) and tile 520D corresponds to a participant who has joined the live session by telephone (via a client device without a video camera, e.g., phone 412 of FIG. 4). An active speaker is indicated by a spotlight 522 applied to tile 520B, shown as a bolded outline of tile 520B. The spotlight 522 may comprise a suitable means of emphasis, for example, a thickened or colored border around the tile 520B; a resizing of tile 520B; a repositioning of tile 520B; an enlarging and/or highlighting of a text overlay within tile 520B such as a participant's name, and so on. The spotlight 522 may indicate that the participant of tile 520B is a current speaker in the live session. As used herein, "spotlight" may be a noun describing some sort of emphasizing or highlighting of a tile, or it may be a verb describing an act of emphasizing or highlighting the tile.

A console 530 is displayed on a right portion of the graphical interface 510, which comprises a lists area 540 indicating a plurality of available lists, a rules area 550 indicating a plurality of rules, a controls area 560 providing navigation controls, and a queue area 570 indicating a plurality of participants who have been identified and/or selected via dynamic selection of participants as disclosed herein. The console 530 may, but need not, be generally rectangular, and it may be displayed at a suitable location within the graphical interface 510, or it may be displayed by a graphical interface of a second display of second device of the host, for example, on a mobile phone or room-system interface, that is different from a first client device of the host that displays the tiles 520A-520D, such as a laptop computer. The lists area 540, the rules area 550, the controls area 560, and the queue area 570 may each be a contiguous area or a plurality of noncontiguous areas, and their relative positions may vary.

The lists area 540 shows a plurality of list names 544, e.g., "Everyone," "Raised hand," and so on. Adjacent to each list name 544 is a user-interface element, in this case a checkbox 546, that enables the host to select one or more of the lists, where selection of a list may be indicated and carried out by asserting a respective checkbox, for example, with a cursor controlled by a positional input device. The checkboxes in the lists area 540 indicates that multiple lists may be selected at a time; however, in some implementations, only one list may be selected at a time. In some implementations, other user-interface elements may be utilized, such as buttons, radio buttons, dropdowns, toggles, sliders, hypertext, and so on. In some implementations, a default list may be preselected.

The rules area 550 shows a plurality of rule names 554, e.g., "Random," "Least talkative," and so on. Adjacent to each rule name 554 is a radio button 556 that enables the host to select one of the lists, where selection of a rule may be indicated and carried out by asserting a respective radio button, for example, with a cursor controlled by a positional input device. The radio buttons in the rules area 550 indicates that only one rule may be selected at a time; however, in some implementations, multiple rules may be selected at a time. In some implementations, other user-interface elements may be utilized, such as buttons, checkboxes, dropdowns, toggles, sliders, hypertext, and so on. In some implementations, a default rule may be preselected.

The controls area 560 shows a button 566 for starting and stopping (or restarting) the dynamic selection of participants. In FIG. 5, the button 566 is labeled "Stop," indicating that dynamic selection of participants is currently active, and pressing the button 566 will stop dynamic selection of participants. Prior to starting (e.g., activating) dynamic selection of participants, the button 566 may display, for example, "Start." Various sequences of states and corresponding displays of the button 566 are possible. For example, the button 566 may display "Start" before dynamic selection of participants begins; the button 566 may display "Stop" while dynamic selection of participants is active; the button 566 may display "Resume" when the hosts presses the button 566 when it displays "Stop" (indicating that pressing the button 566 will resume the currently paused dynamic selection of participants); the button 566 may display "Restart" when the host modifies, for example, selections of lists and/or rules or rule parameters (indicating that pressing the button 566 will restart dynamic selection of participants with the newly selected lists and/or newly applicable rules or rule parameters); and so on. Alternatively, multiple buttons or other user-interface mechanisms may be utilized to convey to the host a current state of dynamic selection of participants and possible next states.

The controls area 560 further shows a button 568, labeled "Next," for selecting a next participant in a queue of participants shown in the queue area 570. The button 568 may be invisible, faded, or grayed out prior to the host starting dynamic selection of participants, e.g., before the host presses a "Start" button. Alternatively, multiple buttons or other user-interface mechanisms may be utilized to convey to the host a current state of dynamic selection of participants and possible next states. There may be more of fewer buttons in the controls area 560, and their appearance properties, such as overlay text, color, shape, visibility, and so on, may be independently varied depending on the state of the system, e.g., whether dynamic selection of participants has been started, stopped, restarted, and so on.

Each of the lists area 540, the rules area 550, the controls area 560, and the queue area 570 may include more or fewer user-interface elements than are shown in FIG. 5, for example, each area may include additional buttons, radio buttons, checkboxes, dropdowns, toggles, sliders, text fields, hypertext, and so on. The console 530 may include more or fewer areas. For example, the "Meeting Chat" shown in the console 530 may instead be provided in a separate window or widget separate from the console 530. The console 530 and/or the areas within or related to the console 530 may sometimes be referred to herein as widgets.

In some implementations, the size, position, and appearance of the areas within the console 530, and the console 530 itself, may be configurable, for example, at the client level (e.g., by a user of a client device (who is a host of a live session) such as the client 104A of FIG. 1), at the customer level (e.g., by a system administrator of a customer such as the customer 102A of FIG. 1), and/or at the application level (e.g., by UCaaS platform provider such as an operator of a data center such as the datacenter 106 of FIG. 1). For example, at the client level, the host may be able to resize, reposition, minimize, maximize, dock, undock, float, and unfloat the console 530 or an area within the console 530, e.g., any of the lists area 540, the rules area 550, the controls area 560, and the queue area 570.

Figure 6:
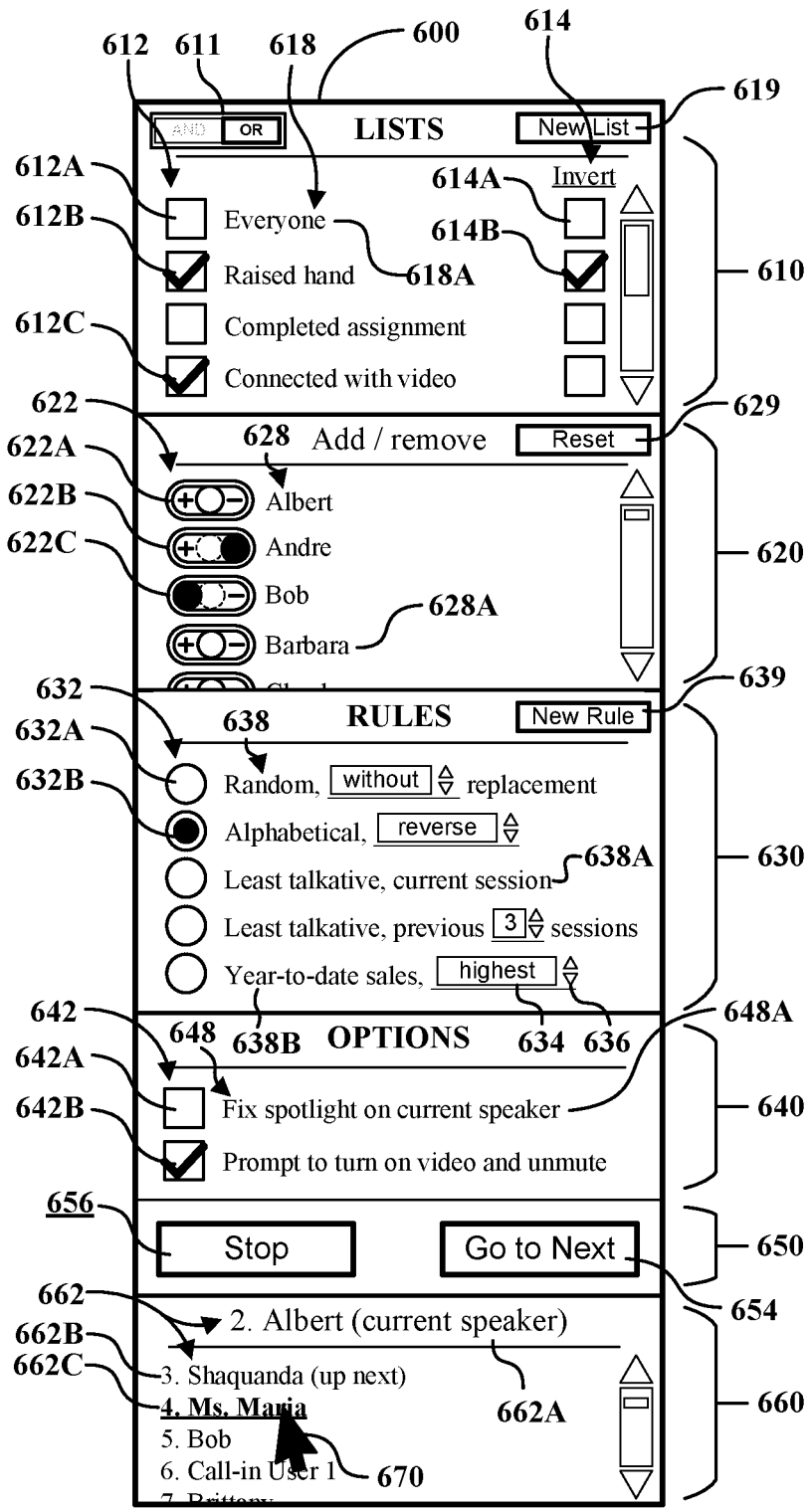
FIG. 6 is an example of a console interface that may be presented to a host during a live session.

FIG. 6 is an example of a console interface that may be presented to a host during a live session. The console 600 may be, for example, an implementation of the console 530 of FIG. 5. The console 600 includes a lists area 610, an add/remove area 620, a rules area 630, an options area 640, a controls area 650, and a queue area 660. Each of these areas may be a contiguous area or a plurality of noncontiguous areas; their relative positions may vary; and they may include more or fewer user-interface elements than are shown in FIG. 6, for example, each area may include additional buttons, radio buttons, checkboxes, dropdowns, toggles, sliders, text fields, hypertext, and so on.

The lists area 610 comprises one or more lists indicated by list names 618, including a list name 618A labeled "Everyone" (e.g., every participant in the live session). Adjacent to (or otherwise associated with) each list name 618 is a respective one of checkboxes 612 (left of the list names 618), including a checkbox 612A, which is an example of a checkbox that has not been asserted; and checkbox 612B and 612C, which are examples of checkboxes that have been asserted to select a "Raised hand" list and a "Connected with video" list, respectively. Multiple lists can be selected and combined using set operators such as union, intersection, and difference. An "indicated list" may consist of just one selected list or it may comprise multiple selected lists that are combined via set operators. Thus, an indicated list is based on the one or more selected lists.

The lists area 610 includes a slider 611 that enables the host to select an operator to apply when multiple lists are selected, where "AND" corresponds to the union operator and "OR" corresponds to the intersection operator (difference is not shown as a user-selectable option in the example console 600). In the example console 600, "OR" has been asserted to perform the union operator on the selected lists. For a streamlined user experience, slider 611 may be absent, and instead, a default operator (or operators) may be utilized for dynamic selection of participants when multiple lists are selected, where the union operator may be a convenient and useful default operator. As an example, applying the union operator to the selected lists "Raised hand" and "Connected with video" (i.e., "indicated list"="Raised hand"∪"Connected with video") results in an indicated list consisting of all participants from both lists, i.e., all participants who satisfy either (or both) criterion of: (1) currently activating the "hand-raised" feature; or (2) currently connected to the live session via a video-enabled device. As another example, applying the intersection operator to the selected lists "Raised hand" and "Connected with video" (i.e., "indicated list"="Raised hand" n "Connected with video") results in an indicated list consisting of only participants who satisfy both criteria of: (1) currently activating the "hand-raised" feature; and (2) currently connected to the live session via a video-enabled device. In general, the host is not considered a participant for purposes of inclusion in lists for use in dynamic selection of participants.

Adjacent (or otherwise associated with) some or all of the list names 618 is a respective one of checkboxes 614 (right of the list names 618), collectively labeled "Invert," including a checkbox 614A, which is an example of a checkbox that has not been asserted, and a checkbox 614B, which is an example of a checkbox that has been asserted. Asserting a checkbox 614 under the collective label "Invert," such as checkbox 614B, inverts the associated list, in this example, the list associated with the "Raised hand" list name 618. As indicated earlier, a list is a set, thus, a list can be manipulated by set operations. Inverting a list may be achieved by determining the difference between a list E, comprising all participants in the live session, and the selected list S, mathematically represented as /S=E−S. For example, inverting the list "Raised hand" results in a list consisting of all participants who are not currently activating the "hand-raised" feature of the conferencing system; inverting the list "Completed assignment" results in a list consisting of all participants who did not complete the assignment; and so on. A checkbox 614 for inverting a list may be absent for some lists, for example, for a list of "Everyone," because the inverse of every participant in the live session is no participants, i.e., an empty set, which may not be helpful for selecting participants in the live session. For a streamlined user experience, checkboxes 614 may be absent. The use of checkboxes in the lists area 610 is for example only, and other suitable user-interface elements may be used.

The lists area 610 includes a button 619, labeled "New List," which enables the host to add, edit, import, create, or otherwise manipulate one or more lists for use in dynamic selection of participants. For example, pressing the button 619 may result in a pop-up window appearing, in which the host may enter additional input. The additional input may include, for example, typing in or manually selecting the names of participants, importing a file comprising a list of participants from a third-party application, and so on.

The add/remove area 620 comprises a listing of all participants in the live session indicated by participant names 628, including a participant name 628A labeled "Barbara" (which is the participant's name, screen name, username, alias, or other identifier in the live session). Adjacent to (or otherwise associated with) each participant name 628 is a respective one of three-way sliders 622 (left of the participant names 628), including a slider 622A, which is an example of a slider that has not been asserted, meaning the associated participant "Albert" will neither be added nor removed from the list or combination of lists selected in the lists area 610; slider 622B, which is an example of a slider that has been asserted to the right (toward and on top of the minus ("−") sign) to indicate removal of the associated participant "Andre" from the list or combination of lists selected in the lists area 610; and slider 622C, which is an example of a slider that has been asserted to the left (toward and on top of the plus ("+") sign) to indicate addition of the associated participant "Bob" to the list or combination of lists selected in the lists area 610. The de-asserted state of the sliders 622 may be a default state. The left and right assertion directions, and the "+" and "−" symbols, are for example only, and suitable directions, symbols, or characters (or no symbols or characters) may be used. The use of sliders in the add/remove area 620 is for example only, and other suitable user-interface elements may be used.

As indicated above, asserting a slider 622 to the left, on top of the "+" sign, as shown for slider 622C, adds the associated participant to the list or combination of lists selected in the lists area 610, i.e., it adds the associated participant to the indicated list (where the indicated list is a selected list that may or may not have been altered or a combination of one or more selected lists that may or may not have been altered). Because the associated participant is effectively a list consisting of a single participant, the addition of the associated participant caused by asserting slider 622C may be conducted by a processor applying the union operator to the indicated list and the associated participant (i.e., "indicated list"="indicated list"∪"associated participant"). If no lists have been selected in the lists area 610, then the indicated list may be empty, and adding the associated participant may result in an indicated list consisting of only the associated participant. In this manner, by adding several associated participants via the sliders 622, a custom indicated list can be created by the host.

As indicated above, asserting a slider 622 to the right, on top of the "−" sign, as shown for slider 622B, removes the associated participant from the list or combination of lists selected in the lists area 610, i.e., it removes the associated participant from the indicated list. Because the associated participant is effectively a list consisting of a single participant, the removal of the associated participant caused by asserting slider 622B may be conducted by a processor applying the difference operator to the indicated list and the associated participant (i.e., "indicated list"="indicated list"−"associated participant"). If no lists have been selected in the lists area 610, or if the indicated list does not contain the associated participant, then removal of the associated participant has no effect.

The add/remove area 620 includes a button 629, labeled "Reset," which enables the host to reset all of the sliders 622 to a default assertion, for example, to de-assert all of the sliders 622 so that none indicate addition or removal.

The rules area 630 comprises one or more rules indicated by rule names 638, including a rule name 638A labeled "Least talkative, current session" (e.g., a rule for selecting a participant from a list who has had the least amount of active engagement (e.g., speaking) during the current live session); and a rule name 638B labeled "Year-to-date sales" (e.g., a rule for selecting a participant on the basis of a year-to-date sales number associated with the participant). Some rules, such as the rule associated with rule name 638B, may be parameterized, such that the rule can be modified by the host through the console 600. For example, the "Year-to-date sales" includes a rule parameter 634 and a parameter selector 636. The rule parameter 634 indicates "highest," meaning the "Year-to-date sales" rule should be applied as "Highest year-to-date sales" when selecting participants, i.e., the rule selects the participant from an indicated list who is associated with the highest year-to-date sales. The parameter selector 636 enables the host to select a different value for the parameter, for example, "lowest." Rule parameters may be qualitative, such as "highest/lowest," "with/without," "including/excluding," forward/reverse," and so on, or they may be quantitative, e.g., numerical. For example, the rule "Least talkative, previous _____ sessions" shown in FIG. 6 includes a quantitative parameter and a parameter selector that enables the host to select a quantity of previous sessions (an example value of "3" sessions is shown in FIG. 6). Either an unparameterized rule, or a parameterized rule along with one or more selected values of its parameter(s), may be referred to as an "indicated rule." Thus, the indicated rule is based on the rule. For a streamlined user experience, the rules area 630 may include only non-parameterized rules.

Adjacent to (or otherwise associated with) each rule name 638 is a respective one of radio buttons 632 (left of the rule names 638), including a radio button 632A, which is an example of a radio button that has not been asserted; and radio button 632B, which is an example of a radio button that has been asserted to select an "Alphabetical" rule to apply to an indicated list, i.e., to the combination of selected lists shown in the lists area 610.

The rules area 630 includes a button 639, labeled "New Rule," which enables the host to add, edit, import, create, or otherwise manipulate one or more rules for use in dynamic selection of participants. For example, pressing the button 639 may result in a pop-up window appearing, in which the host may enter additional input. The additional input may include, for example, typing in or otherwise selecting logical operators (e.g., Boolean operators, sorting operators, filtering operators, and so on), importing a rule from a third-party application, defining parameters for parameterized rules, and so on.

The options area 640 comprises one or more options, or features, that may be available during the live session, indicated by option names 648, including an option 648A labeled "Fix spotlight on current speaker" (e.g., automatically highlight the tile of a selected participant (or the participant at the top of a queue of participants selected via dynamic selection of participants) and maintain the highlight until another participant (or the next participant in the queue) is in the queue selected.

Adjacent to (or otherwise associated with) each option name 648 is a respective one of checkboxes 642 (left of the options names 648), including a checkbox 642A, which is an example of a checkbox that has not been asserted; and checkbox 642B, which is an example of a checkbox that has been asserted to select an option to "Prompt to turn on video and unmute" (e.g., automatically prompt a selected participant to enable video and to enable audio on his client device). Enabling video on a device may comprise turning on or activating a webcam or video camera, and enabling audio on a device may comprise turning on, activating, or unmuting a microphone.

The controls area 650 comprises one or more buttons that enable the host to control the operation of dynamic selection of participants, including a button 656 labeled "Stop," which enables the host to at least start and stop dynamic selection of participant, and a button 654 labeled "Go to Next," which enables the host to advance dynamic selection of participants to a next selected participant.

As described earlier with reference to FIG. 5, a button may have an altered appearance depending on a current state of dynamic selection of participants, such as an overlay text, color, shape, visibility, and so on. The text displayed on example button 656 changes according to the states of dynamic selection of participants, where various sequences of states and corresponding text overlays are possible. For example, the button 656 may display "Start" before dynamic selection of participants begins; the button 656 may display "Stop" while dynamic selection of participants is active; the button 656 may display "Resume" when the hosts presses the button 656 while it displays "Stop" (indicating that pressing the button 656 again will resume the currently paused dynamic selection of participants); the button 656 may display "Restart" when the host modifies, for example, selections of lists and/or rules or rule parameters (indicating that pressing the button 656 will restart dynamic selection of participants with the newly selected lists and/or newly applicable rules and rule parameters); and so on. The text displayed on example button 654 is always "Go to Next"; however, the visibility of the button 654 changes according to the states of dynamic selection of participants. For example, the button 654 may be invisible, faded, or grayed out prior to the host starting dynamic selection of participants or during a pause of dynamic selection or participants (e.g., when the button 656 displays "Start" or "Resume"); and the button 654 may be fully visible and/or vibrant during dynamic selection of participants (e.g., when the button 656 displays "Stop").

The queue area 660 comprises a queue 662 that have been selected by dynamic selection of participants, including a currently spotlighted participant, e.g., the current speaker 662A, labeled "2. Albert (current speaker)," and one or more upcoming speakers, such as an up-next speaker 662B, labeled "3. Shaquanda (up next)," and a subsequent speaker 662C, labeled "4. Ms. Maria." Each item of the queue 662 may include the name, screen name, username, alias, or other identifier of a given participant in the live session, and it may include a numeral, e.g., from the positive integers 1, 2, 3, 4, . . . , indicating a place, position, or order of the participant in the queue 662.

When a host presses the button 654, labeled "go to Next," the selection of the current speaker 662A ends, e.g., by terminating the spotlight thereon, and the selection advances to the up-next speaker 662B. In some implementations, a participant, for example subsequent speaker 662C, of the queue 662 (other than the current speaker 662A) can be selected by placing a cursor 670, controlled by a positional input device, over the displayed text of the subsequent speaker 662C and actuating a button of the positional input device (e.g., selecting the subsequent speaker 662C with a mouse). In doing so, the up-next speaker 662B is skipped and subsequent speaker 662C becomes the new current speaker. In this manner, participants in the queue 662 can be skipped.

Figure 7A:
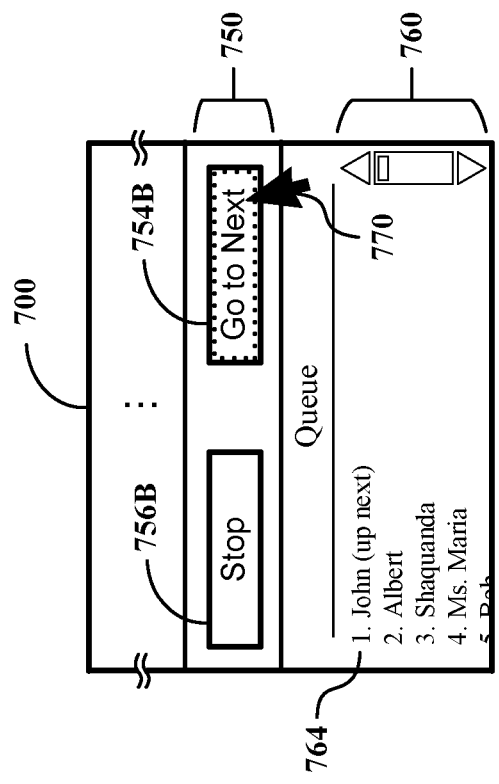
FIGS. 7A-7D show an example of a sequence of dynamic selection of participants.

FIGS. 7A-7D show an example sequence of dynamic selection of participants. FIG. 7A depicts a portion of a console 700 including a control area 750 and a queue area 760 (where the console 700 may be an implementation of the console 600 of FIG. 6), prior to beginning dynamic selection of participants. The console 700 shows a button 754A, labeled "Go to Next," grayed out because there are no selected participants yet. A cursor 770, controlled by a positional input device, is shown hovering over a button 756A, labeled "Start." The button 756A is highlighted, depicted by the dotted rectangle, as a result of the cursor 770 hovering over the button 756A.

Figure 7C:
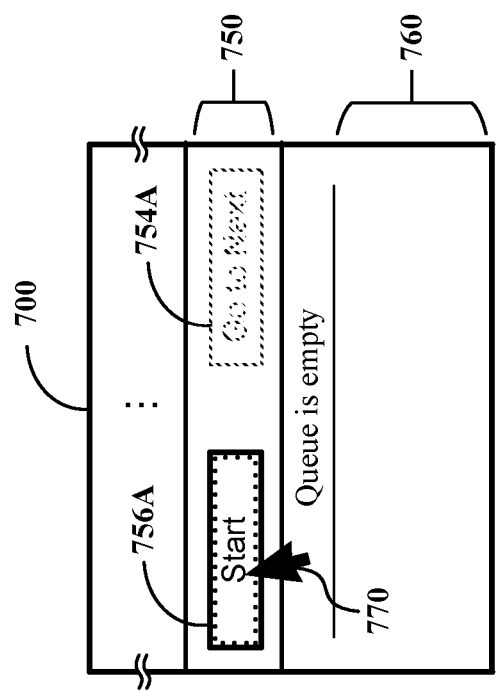
Figure 7B:
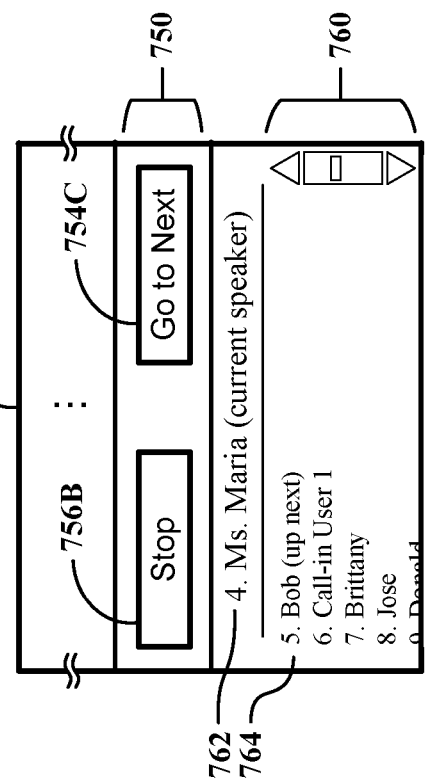

FIG. 7B shows the console 700 after the cursor 770 in FIG. 7A selected the button 756A (labeled "Start") to begin dynamic selection of participants. A plurality of participants are shown in the queue, including up-next speaker 764, labeled "1. John (up next)." In this example sequence, a current speaker is not automatically spotlighted at the start of dynamic selection of participants; however, in some implementations, a current speaker would be automatically spotlighted at the start of dynamic selection of participants. A button 756B (same as the button 756A of FIG. 7A but with a different text label) displays "Stop" to indicate that dynamic selection of participants is running, and further, to indicate that selecting the button 756B with the cursor 770 would stop (or pause) dynamic selection of participants. A button 754B (same as the button 754A of FIG. 7A but with a different text label) displays "Go to Next," and is highlighted, depicted by the dotted rectangle, as a result of the cursor 770 hovering thereover.

FIG. 7C shows the console 700 after the cursor 770 of FIG. 7B selected the button 754B to advance the up-next speaker 764 of FIG. 7B to a current speaker 762, labeled "1. John (current speaker)." Consequently, "Albert" has become the up-next speaker 764. The button 756B still displays "Stop" to indicate that dynamic selection of participants is running, and a button 754C (same as the button 754B of FIG. 7B but without the highlight) displays "Go to Next" without a highlight because the cursor 770 is no longer hovering thereover. A subsequent speaker 766, "labeled "4. Maria," is highlighted, depicted as bolded underlined text, as a result of the cursor 770 hovering thereover.

Figure 7D:
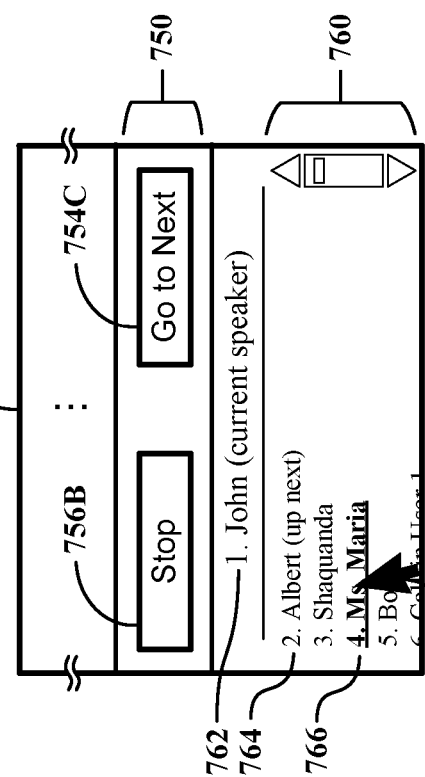

FIG. 7D shows the console 700 after the cursor 770 of FIG. 7C selected the subsequent speaker 766 to advance the subsequent speaker 766 of FIG. 7C to a current speaker 762, labeled "4. Ms. Maria (current speaker)." Consequently, "Bob" has become the up-next speaker 764. The button 756B still displays "Stop" to indicate that dynamic selection of participants is running, and the button 754C still displays "Go to Next." In some implementations, the numerals associated with participants in a queue may be constant with respect to the participant (as in the example of FIGS. 7A-7D), or they may be constant with respect to their respective positions in the queue, e.g., the current speaker is always #1, the up-next speaker is always #2, and so on.

To further describe some implementations in greater detail, reference is next made to examples of techniques which may be performed by or using dynamic selection of participants. FIGS. 8-13 are flowcharts of examples of techniques 800, 900, 1000, 1100, 1200, and 1300 for dynamic selection of participants. The techniques can be executed using computing devices, such as the systems, hardware, and software described with respect to FIGS. 1-7. The techniques can be performed, for example, by executing a machine-readable program or other computer-executable instructions, such as routines, instructions, programs, or other code. The steps, or operations, of the techniques, or another technique, method, process, or algorithm described in connection with the implementations disclosed herein can be implemented directly in hardware, firmware, software executed by hardware, circuitry, or a combination thereof.

For simplicity of explanation, each technique is depicted and described herein as a series of steps or operations. However, the steps or operations of the techniques in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The techniques 800 and 900 are techniques of dynamic selection of participants that may be implemented by a client device connected to a video conference. The techniques 1000-1100 are techniques of dynamic selection of participants that may be implemented by a server configured to deliver video conferencing services including a video conference. The techniques 1200-1300 are techniques of dynamic selection of participants that may be implemented by a client-server computing system (e.g., a distributed computing system that may comprise a server and one or more client devices) configured to deliver video conferencing services including a video conference.

Figure 8:
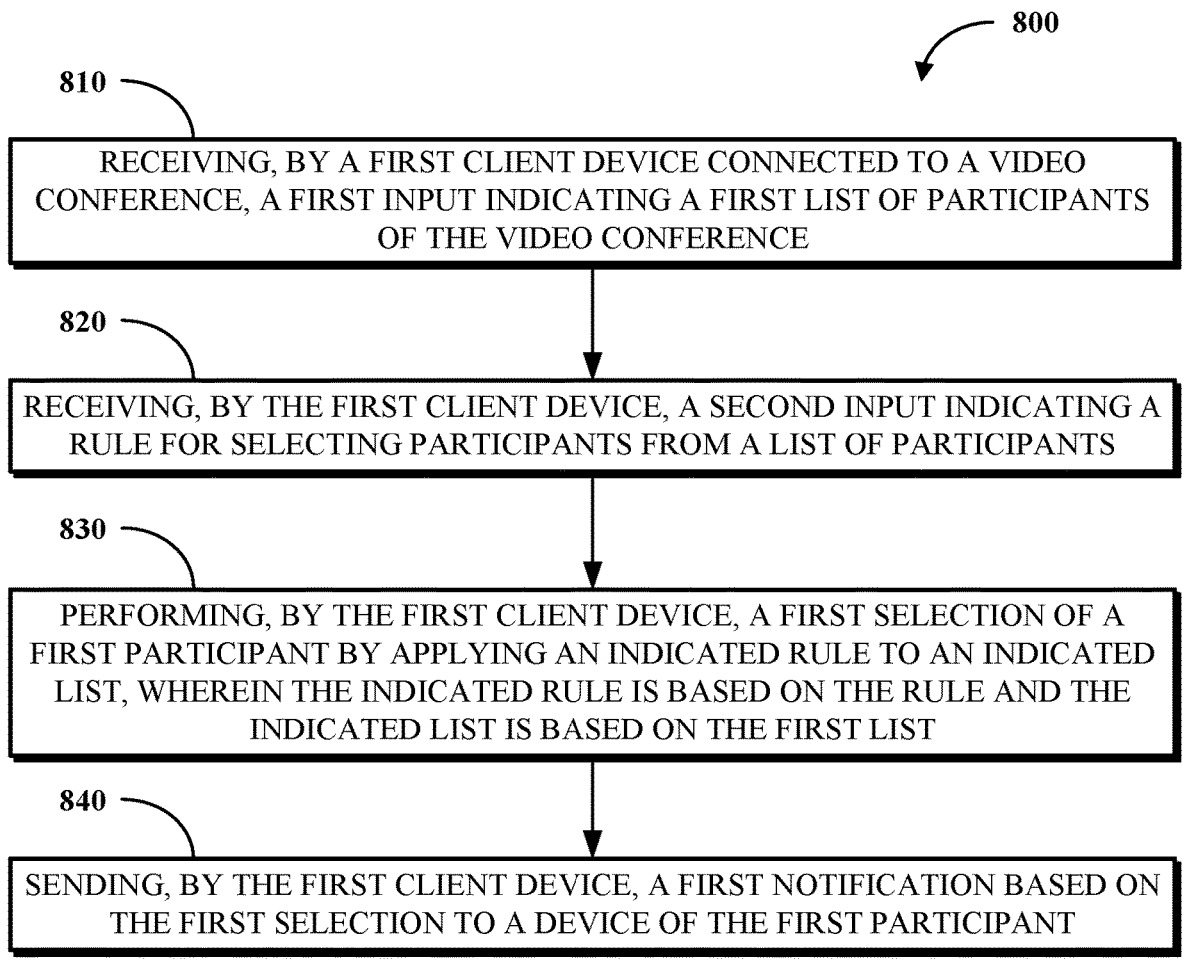
FIG. 8 is a flowchart of an example of a technique for dynamic selection of participants that may be implemented via a client device.

FIG. 8 is a flowchart of an example of a technique 800 for dynamic selection of participants that may be implemented via a client device. The step 810 comprises receiving, by a first client device connected to a video conference, a first input indicating a first list of participants of the video conference. The first client device may be a client device 408 or 410 of FIG. 4 having a user interface 212. The video conference may be implemented by a conferencing system, e.g., the conferencing system 400 of FIG. 4. The client device may utilize a network interface, e.g., the network interface 214, to connect to the video conference via a network, e.g., the network 114 of FIG. 1. The first input may be an assertion of a user-interface element displayed in a host console presented to a host of a live session of the video conference, e.g., the host asserting of one of the checkboxes 612 in the lists area 610 of the console 600 of FIG. 6. Alternatively, the first input may be an input comprising a list of participants, which may be achieved, for example, by the host adding, editing, importing, creating, or otherwise manipulating a list for use in dynamic selection of participants. The first list may be a set or ordered set of participants based on suitable criteria, for example: whether video is enabled on a client device of the participant connected to the video conference; whether audio is enabled on a client device of the participant connected to the video conference; whether a hand-raised feature of the video conference is indicated for the participant; whether the participant has already been selected by application of the indicated rule to the indicated list; whether the participant's speaking during the video conference is below a predetermined participation threshold; whether a quality of a connection of a client device of the participant to the video conference exceeds a predetermined quality level; or whether the participant has performed a specified task outside the video conference.

The step 820 comprises receiving, by the first client device, a second input indicating a rule for selecting participants from a list of participants. The second input may be an assertion of a user-interface element displayed in the host console, e.g., the host asserting of one of the radio buttons 632 in the rules area 630 of the console 600 of FIG. 6. The rule may be a suitable rule, process, method, or procedure for selecting a participant from a list, for example: a random selection with or without replacement; a forward or reverse alphabetical-order selection; a least- or most-talkative selection; a highest- or lowest-ranked selection (where a suitable metric may be used to rank, e.g., grades, sales, scores, number of tasks completed, etc.); or a selection according to an order in an ordered list. Rules that do not involve a sorting aspect, for example, random selection, may be applied iteratively with or without replacement of the selected participant(s). Rules that involve a sorting aspect, for example, alphabetical, talkativeness, ranked, and so on, may be applied iteratively, e.g., reapplied, without replacement (because applying iteratively with replacement may result in the same participant being selected in every iteration).

The step 830 comprises performing, by the first client device, a first selection of a first participant by applying an indicated rule to an indicated list, wherein the indicated rule is based on the rule and the indicated list is based on the first list. The first client may apply the indicated rule to the indicated list via instructions executed on a processor coupled to a memory, e.g., computer instructions executed on the processor 202 coupled to the memory 204 of FIG. 2. Application of the indicated rule to the indicated list may comprise sorting or filtering of the indicated list. For example, application of an "alphabetical order selection" indicated rule may comprise sorting the indicated list alphabetically and then selecting the first-listed participant in the sorted indicated list. In some implementations, the indicated list may be identical to the first list. In some implementations, the indicated list may be a subset of the first list. In some implementations, the indicated list may be a superset of the first list. In some implementations, the indicated list may be a combination of the first list and one or more other lists, where the combination is achieved by applying one or more set operations to the first list and the one or more other lists. In some implementations, a further step may comprise receiving, via the user interface, a fourth input indicating a parameter of the rule, wherein the indicated rule is further based on the parameter and is determined by modifying the rule according to the parameter.

The step 840 comprises sending, by the first client device, a first notification based on the first selection to a device of the first participant. The first notification may be a suitable notification, for example, an indication indicating that the first participant has been selected; an indication instructing the first participant to enable video on the device of the first participant; or an indication instructing the first participant to enable audio on the device of the first participant. The device of the first participant may be a suitable computing device that is capable of receiving and processing the first notification, which may be a client device connected to the video conference or a device not connected to the video conference. As a first example, the first notification may be sent to a client device 408 or 410 connected to the video conference, which causes the client device to display a message via a graphical display (e.g., a user interface 212). As a second example, the first notification may be sent to a mobile phone that is not connected to the video conference, for example, as a text message. The sending of the first notification may involve one or more networks, e.g., network 114 of FIG. 1; one or more network nodes, e.g., hubs, switches, routers, gateways, and so on; and one or more computing devices, e.g., computing device 200 of FIG. 2. In some implementations, the sending of the first notification involves the first client device assembling at least one network datagram, e.g., a frame, a packet, a message, and so on. In some implementations, the payload of the datagram(s) comprises the first notification. In some implementations, the payload of the datagram(s) comprises instructions that cause another computing device to assemble at least one datagram having a payload that comprises the first notification.

Figure 9:
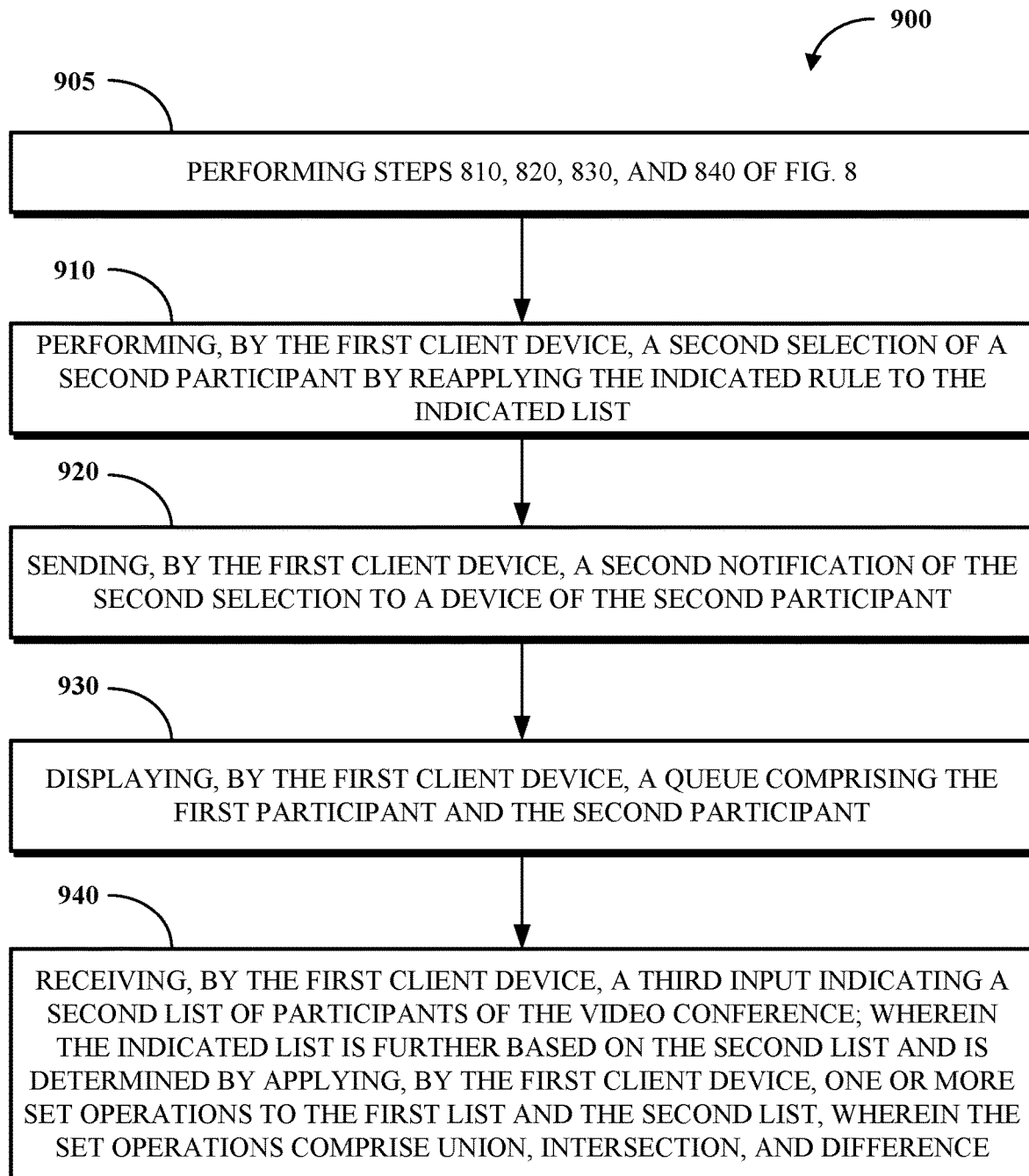
FIG. 9 is a flowchart of another example of a technique for dynamic selection of participants that may be implemented via a client device.

FIG. 9 is a flowchart of an example of a technique 900 for dynamic selection of participants that may be implemented via a client device. The step 905 comprises performing the steps 810, 820, 830, and 840 of FIG. 8. The step 910 comprises performing, by the first client device, a second selection of a second participant by reapplying the indicated rule to the indicated list. "Reapplying" the indicated rule to the indicated list means applying the indicated rule to the indicated list while considering previous selections of participants during the currently active dynamic selection of participants. As an example, reapplying a "random selection without replacement" indicated rule to an indicated list would randomly select a participant from the indicated list exclusive of any previously selected participants under the indicated rule. As another example, reapplying a "random selection with replacement" indicated rule to an indicated list would randomly select a participant from the indicated list inclusive of any previously selected participants under the indicated rule. The client device may be the client device 408 or 410 of FIG. 4, which may comprise a processor coupled to a memory, e.g., the processor 202 coupled to the memory 204 of FIG. 2. The processor may reapply the indicated rule to the indicated list via instructions executed thereon. Reapplication of the indicated rule to the indicated list may comprise sorting or filtering of the indicated list. For example, reapplication of a "random selection without replacement" indicated rule to an indicated list may comprise filtering the indicated list to exclude previously selected participants under the indicated rule prior to random selection.

The step 920 comprises sending, by the first client device, a second notification of the second selection to a device of the second participant. The second notification may be a suitable notification, for example, an indication indicating that the second participant has been selected; an indication instructing the second participant to enable video on the device of the second participant; or an indication instructing the second participant to enable audio on the device of the second participant. The device of the second participant may be a suitable computing device that is capable of receiving and processing the second notification, which may be a client device connected to the video conference or a device not connected to the video conference. As a first example, the second notification may be sent to a client device 408 or 410 connected to the video conference, which causes the client device to display a message via a graphical display (e.g., a user interface 212). As a second example, the second notification may be sent to a mobile phone that is not connected to the video conference, for example, as a text message.

The step 930 comprises displaying, by the first client device, a queue comprising the first participant and the second participant. The queue may be the queue 662, consisting of the first participant and the second participant, in the queue area 660 of the console 600.

The step 940 comprises receiving, by the first client device, a third input indicating a second list of participants of the video conference; wherein the indicated list is further based on the second list and is determined by applying, by the first client device, one or more set operations to the first list and the second list, wherein the set operations comprise union, intersection, and difference. The third input may be an assertion of a user-interface element displayed in a host console presented to a host of a live session of the video conference, e.g., the host asserting of one of the checkboxes 612 in the lists area 610 of the console 600. Alternatively, the third input may be an input comprising a list of participants, which may be achieved, for example, by the host adding, editing, importing, creating, or otherwise manipulating a list for use in dynamic selection of participants. The one or more set operations (union, intersection, or difference) may be applied to the first list and the second list via instructions executed on a processor coupled to a memory, e.g., computer instructions executed on the processor 202 coupled to the memory 204 of FIG. 2. As first example, the indicated list may be the union of the first list and the second list. As a second example, the indicated list may be the intersection of the first list and the second list. The one or more set operations may be selected by the host, e.g., by the host asserting the slider 611 in the lists area 610 of the console 600 to select "AND" (i.e., intersection) or "OR" (i.e., union), or the one or more set operations may be one or more default operations. The second list may be a set or ordered set of participants based on suitable criteria, for example: whether video is enabled on a client device of the participant connected to the video conference; whether audio is enabled on a client device of the participant connected to the video conference; whether a hand-raised feature of the video conference is indicated for the participant; whether the participant has already been selected by application of the indicated rule to the indicated list; whether the participant's speaking during the video conference is below a predetermined participation threshold; whether a quality of a connection of a client device of the participant to the video conference exceeds a predetermined quality level; or whether the participant has performed a specified task outside the video conference.

Figure 10:
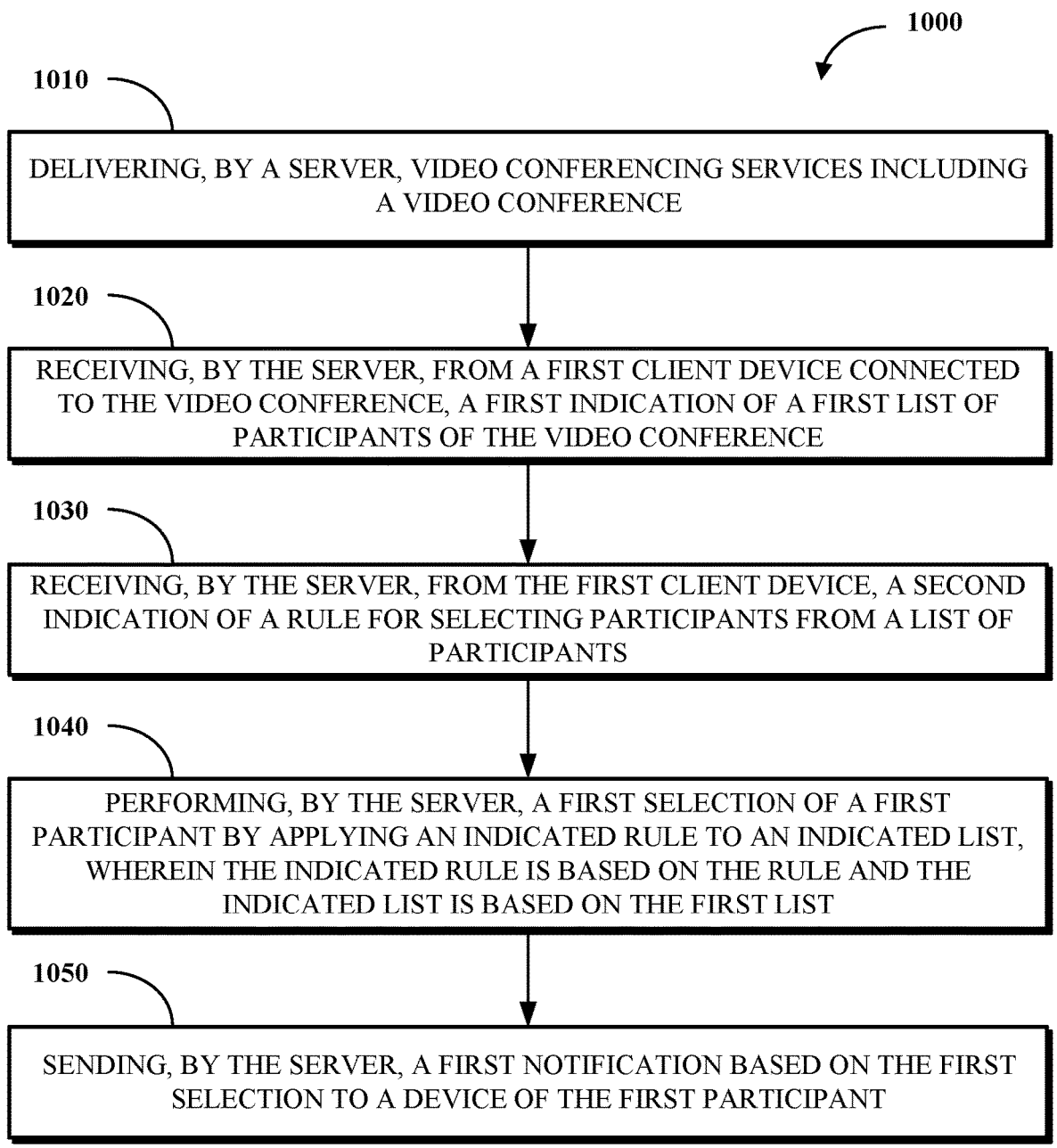
FIG. 10 is a flowchart of an example of a technique for dynamic selection of participants that may be implemented via a server.

FIG. 10 is a flowchart of an example of a technique 1000 for dynamic selection of participants that may be implemented via a server. The step 1010 comprises delivering, by a server, video conferencing services including a video conference. The server may be one or more of the application server 108, the database server 110, or the telephony server 112 of the datacenter 106 of FIG. 1. The video conferencing services may comprise software services of a UCaaS platform, where the UCaaS platform can use a multi-tenant architecture. The video conference may be implemented by a conferencing system, e.g., the conferencing system 400 of FIG. 4.

The step 1020 comprises receiving, by the server, from a first client device connected to the video conference, a first indication of a first list of participants of the video conference. The first client device may be a client device 408 or 410 of FIG. 4. The client device may utilize a network interface, e.g., the network interface 214, to connect to the video conference via a network, e.g., the network 114 of FIG. 1. The first indication may be an identification of the first list of participants that is stored on the server, e.g., in a memory 204; the first indication may be the first list of participants acquired or generated by the first client device; or the first indication may be a combination thereof. The first list may be a set or ordered set of participants based on suitable criteria, for example: whether video is enabled on a client device of the participant connected to the video conference; whether audio is enabled on a client device of the participant connected to the video conference; whether a hand-raised feature of the video conference is indicated for the participant; whether the participant has already been selected by application of the indicated rule to the indicated list; whether the participant's speaking during the video conference is below a predetermined participation threshold; whether a quality of a connection of a client device of the participant to the video conference exceeds a predetermined quality level; or whether the participant has performed a specified task outside the video conference.

The step 1030 comprises receiving, by the server, from the first client device, a second indication of a rule for selecting participants from a list of participants. The second indication may be an identification of the rule that is stored in the server, e.g., in a memory 204; the second indication may be a rule acquired or generated by the first client device; or the second indication may be a combination thereof. The rule may be a suitable rule, process, method, or procedure for selecting a participant from a list, for example: a random selection with or without replacement; a forward or reverse alphabetical-order selection; a least- or most-talkative selection; a highest- or lowest-ranked selection (where a suitable metric may be used to rank, e.g., grades, sales, scores, number of tasks completed, etc.); or a selection according to an order in an ordered list. Rules that do not involve a sorting aspect, for example, random selection, may be applied iteratively with or without replacement of the selected participant(s). Rules that involve a sorting aspect, for example, alphabetical, talkativeness, ranked, and so on, may be applied iteratively, e.g., reapplied, without replacement (because applying iteratively with replacement may result in the same participant being selected in every iteration).

The step 1040 comprises performing, by the server, a first selection of a first participant by applying an indicated rule to an indicated list, wherein the indicated rule is based on the rule and the indicated list is based on the first list. The server may apply the indicated rule to the indicated list via instructions executed on a processor coupled to a memory, e.g., computer instructions executed on the processor 202 coupled to the memory 204 of FIG. 2. Application of the indicated rule to the indicated list may comprise sorting or filtering of the indicated list. For example, application of an "alphabetical order selection" indicated rule may comprise sorting the indicated list alphabetically and then selecting the first-listed participant in the sorted indicated list. In some implementations, the indicated list may be identical to the first list. In some implementations, the indicated list may be a subset of the first list. In some implementations, the indicated list may be a superset of the first list. In some implementations, the indicated list may be a combination of the first list and one or more other lists, where the combination is achieved by applying one or more set operations to the first list and the one or more other lists. In some implementations, a further step may comprise receiving at the server, from the first client device, a fourth input indicating a parameter of the rule, wherein the indicated rule is further based on the parameter and is determined by modifying the rule according to the parameter.

The step 1050 comprises sending, by the server, a first notification based on the first selection to a device of the first participant. The first notification may be a suitable notification, for example, an indication indicating that the first participant has been selected; an indication instructing the first participant to enable video on the device of the first participant; or an indication instructing the first participant to enable audio on the device of the first participant. The device of the first participant may be a suitable computing device that is capable of receiving and processing the first notification, which may be a client device connected to the video conference or a device not connected to the video conference. As a first example, the first notification may be sent to a client device 408 or 410 connected to the video conference, which causes the client device to display a message via a graphical display (e.g., a user interface 212). As a second example, the first notification may be sent to a mobile phone that is not connected to the video conference, for example, as a text message. The sending of the first notification may involve one or more networks, e.g., network 114 of FIG. 1; one or more network nodes, e.g., hubs, switches, routers, gateways, and so on; and one or more computing devices, e.g., computing device 200 of FIG. 2. In some implementations, the sending of the first notification involves the server assembling at least one network datagram, e.g., a frame, a packet, a message, and so on. In some implementations, the payload of the datagram(s) comprises the first notification. In some implementations, the payload of the datagram(s) comprises instructions that cause another computing device to assemble at least one datagram having a payload that comprises the first notification.

Figure 11:
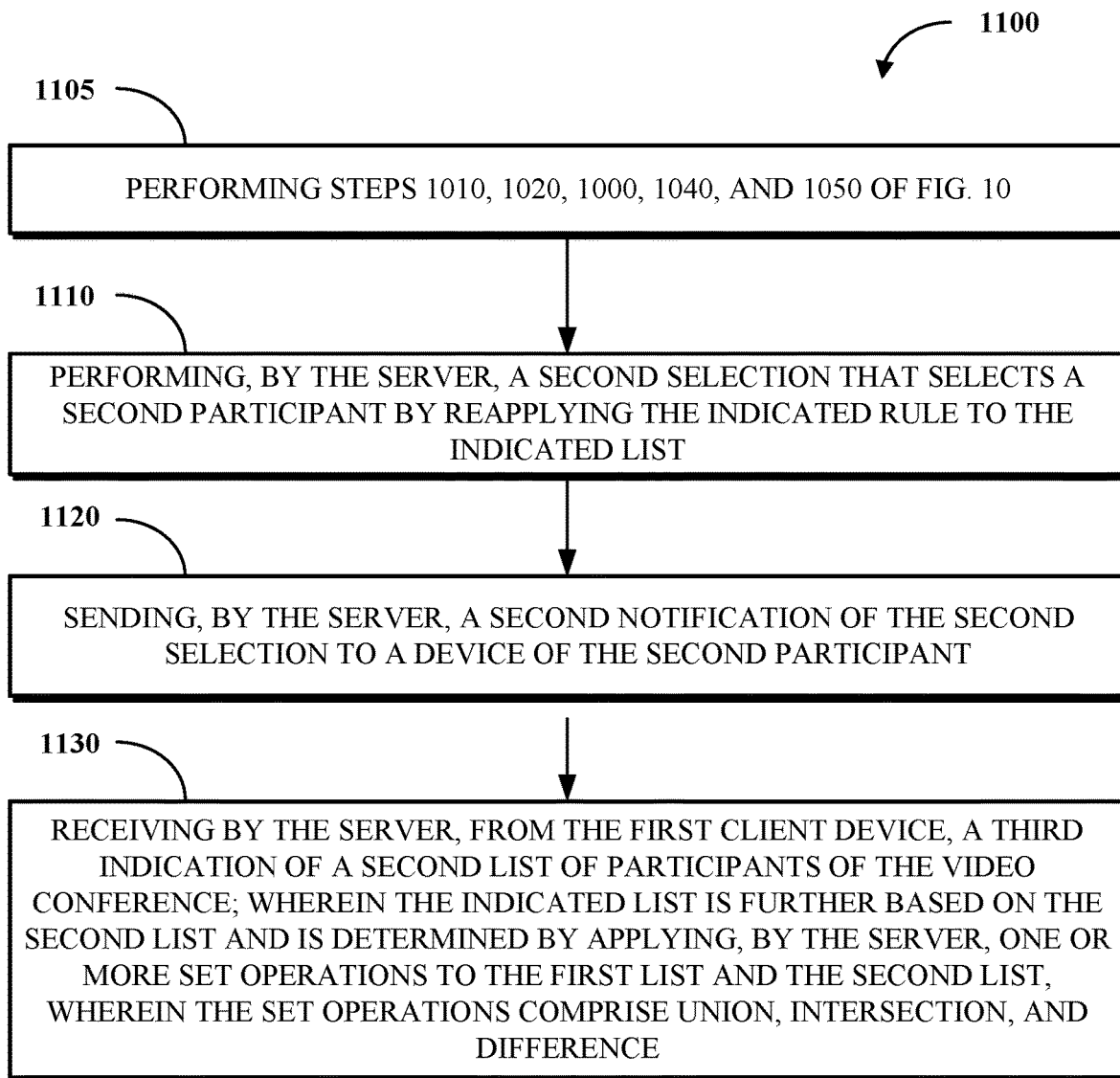
FIG. 11 is a flowchart of another example of a technique for dynamic selection of participants that may be implemented via a server.

FIG. 11 is a flowchart of an example of a technique 1100 for dynamic selection of participants that may be implemented via a server. The step 1105 comprises performing the steps 1010, 1020, 1030, 1040, and 1050 of FIG. 10. The step 1110 comprises performing, by the server, a second selection that selects a second participant by reapplying the indicated rule to the indicated list. "Reapplying" the indicated rule to the indicated list means applying the indicated rule to the indicated list while considering previous selections of participants during the currently active dynamic selection of participants. As an example, reapplying a "random selection without replacement" indicated rule to an indicated list would randomly select a participant from the indicated list exclusive of any previously selected participants under the indicated rule. As another example, reapplying a "random selection with replacement" indicated rule to an indicated list would randomly select a participant from the indicated list inclusive of any previously selected participants under the indicated rule. The server may be one or more of the application server 108, the database server 110, or the telephony server 112 of the datacenter 106 of FIG. 1, which may comprise a processor coupled to a memory, e.g., the processor 202 coupled to the memory 204 of FIG. 2. The processor may reapply the indicated rule to the indicated list via instructions executed thereon. Reapplication of the indicated rule to the indicated list may comprise sorting or filtering of the indicated list. For example, reapplication of a "random selection without replacement" indicated rule to an indicated list may comprise filtering the indicated list to exclude previously selected participants under the indicated rule prior to random selection.

The step 1120 comprises sending, by the server, a second notification of the second selection to a device of the second participant. The second notification may be a suitable notification, for example, an indication indicating that the second participant has been selected; an indication instructing the second participant to enable video on the device of the second participant; or an indication instructing the second participant to enable audio on the device of the second participant. The device of the second participant may be a suitable computing device that is capable of receiving and processing the second notification, which may be a client device connected to the video conference or a device not connected to the video conference. As a first example, the second notification may be sent to a client device 408 or 410 connected to the video conference, which causes the client device to display a message via a graphical display (e.g., a user interface 212). As a second example, the second notification may be sent to a mobile phone that is not connected to the video conference, for example, as a text message.

The step 1130 comprises receiving by the server, from the first client device, a third indication of a second list of participants of the video conference; wherein the indicated list is further based on the second list and is determined by applying, by the server, one or more set operations to the first list and the second list, wherein the set operations comprise union, intersection, and difference. The third indication may be an identification of the second list of participants that is stored on the server, e.g., in a memory 204; the third indication may be the second list of participants acquired or generated by the first client device; or the third indication may be a combination thereof. The one or more set operations (union, intersection, or difference) may be applied to the first list and the second list via instructions executed on a processor coupled to a memory, e.g., computer instructions executed on the processor 202 coupled to the memory 204 of FIG. 2. As first example, the indicated list may be the union of the first list and the second list. As a second example, the indicated list may be the intersection of the first list and the second list. The one or more set operations may be indicated to the server by the first client device, for example, as part of the third indication, or the one or more set operations may be determined by the server in a suitable manner, for example, as one or more default operations. The second list may be a set or ordered set of participants based on suitable criteria, for example: whether video is enabled on a client device of the participant connected to the video conference; whether audio is enabled on a client device of the participant connected to the video conference; whether a hand-raised feature of the video conference is indicated for the participant; whether the participant has already been selected by application of the indicated rule to the indicated list; whether the participant's speaking during the video conference is below a predetermined participation threshold; whether a quality of a connection of a client device of the participant to the video conference exceeds a predetermined quality level; or whether the participant has performed a specified task outside the video conference.

Figure 12:
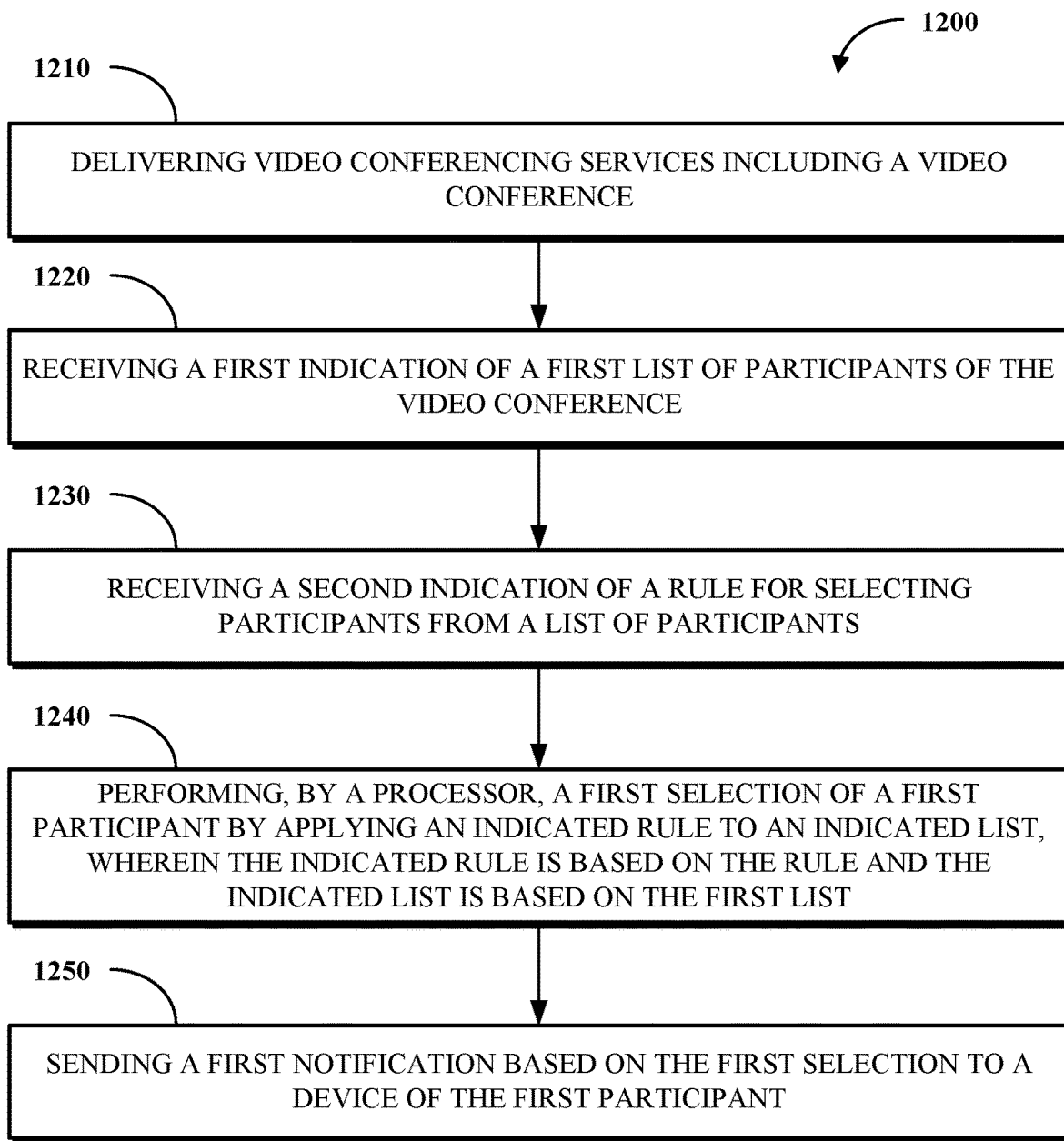
FIG. 12 is a flowchart of an example of a technique for dynamic selection of participants that may be implemented via one or more servers and/or one or more clients.

FIG. 12 is a flowchart of an example of a technique 1200 for dynamic selection of participants that may be implemented via one or more servers and/or one or more clients. The step 1210 comprises delivering video conferencing services including a video conference. The video conferencing services may comprise software services of a UCaaS platform, where the UCaaS platform can use a multi-tenant architecture. The video conference may be implemented by a conferencing system, e.g., the conferencing system 400 of FIG. 4.

The step 1220 comprises receiving a first indication of a first list of participants of the video conference. The first indication may be received from one or more client devices, e.g., client devices 408 or 410 of FIG. 4; from one or more servers, e.g., the application server 108, the database server 110, or the telephony server 112 of the datacenter 106 of FIG. 1; or a combination thereof. The first indication may be an identification of the first list of participants that is stored in a server, e.g., in a memory 204, or acquired or generated thereby; the first indication may be the first list of participants that is stored in a client device, e.g., in a memory 204, or acquired or generated thereby; or the second indication may be a combination thereof. The first list may be a set or ordered set of participants based on suitable criteria, for example: whether video is enabled on a client device of the participant connected to the video conference; whether audio is enabled on a client device of the participant connected to the video conference; whether a hand-raised feature of the video conference is indicated for the participant; whether the participant has already been selected by application of the indicated rule to the indicated list; whether the participant's speaking during the video conference is below a predetermined participation threshold; whether a quality of a connection of a client device of the participant to the video conference exceeds a predetermined quality level; or whether the participant has performed a specified task outside the video conference.

The step 1230 comprises receiving a second indication of a rule for selecting participants from a list of participants. The second indication may be received from one or more client devices, e.g., client devices 408 or 410 of FIG. 4; from one or more servers, e.g., the application server 108, the database server 110, or the telephony server 112 of the datacenter 106 of FIG. 1; or a combination thereof. The second indication may be an identification of the rule that is stored in a server, e.g., in a memory 204, or acquired or generated thereby; the second indication may be the rule that is stored in a client device, e.g., in a memory 204, or acquired or generated thereby; or the second indication may be a combination thereof. The rule may be a suitable rule, process, method, or procedure for selecting a participant from a list, for example: a random selection with or without replacement; a forward or reverse alphabetical-order selection; a least- or most-talkative selection; a highest- or lowest-ranked selection (where a suitable metric may be used to rank, e.g., grades, sales, scores, number of tasks completed, etc.); or a selection according to an order in an ordered list. Rules that do not involve a sorting aspect, for example, random selection, may be applied iteratively with or without replacement of the selected participant(s). Rules that involve a sorting aspect, for example, alphabetical, talkativeness, ranked, and so on, may be applied iteratively, e.g., reapplied, without replacement (because applying iteratively with replacement may result in the same participant being selected in every iteration).

The step 1240 comprises performing, by a processor, a first selection of a first participant by applying an indicated rule to an indicated list, wherein the indicated rule is based on the rule and the indicated list is based on the first list. The processor may be coupled to a memory, e.g., the processor 202 coupled to the memory 204 of FIG. 2, each of which may be located in a client device, e.g., client devices 408 or 410 of FIG. 4; in a server, e.g., the application server 108, the database server 110, or the telephony server 112 of the datacenter 106 of FIG. 1; or a combination thereof. The processor may apply the indicated rule to the indicated list via instructions executed on the processor. Application of the indicated rule to the indicated list may comprise sorting or filtering of the indicated list. For example, application of an "alphabetical order selection" indicated rule may comprise sorting the indicated list alphabetically and then selecting the first-listed participant in the sorted indicated list. In some implementations, the indicated list may be identical to the first list. In some implementations, the indicated list may be a subset of the first list. In some implementations, the indicated list may be a superset of the first list. In some implementations, the indicated list may be a combination of the first list and one or more other lists, where the combination is achieved by applying one or more set operations to the first list and the one or more other lists. In some implementations, a further step may comprise receiving a fourth input indicating a parameter of the rule, wherein the indicated rule is further based on the parameter and is determined by modifying the rule according to the parameter.

The step 1250 comprises sending a first notification based on the first selection to a device of the first participant. The first notification may be sent from a client device, e.g., client devices 408 or 410 of FIG. 4; or from a server, e.g., the application server 108, the database server 110, or the telephony server 112 of the datacenter 106 of FIG. 1. The first notification may be a suitable notification, for example, an indication indicating that the first participant has been selected; an indication instructing the first participant to enable video on the device of the first participant; or an indication instructing the first participant to enable audio on the device of the first participant. The device of the first participant may be a suitable computing device that is capable of receiving and processing the first notification, which may be a client device connected to the video conference or a device not connected to the video conference. As a first example, the first notification may be sent to a client device 408 or 410 connected to the video conference, which causes the client device to display a message via a graphical display (e.g., a user interface 212). As a second example, the first notification may be sent to a mobile phone that is not connected to the video conference, for example, as a text message. The sending of the first notification may involve one or more networks, e.g., network 114 of FIG. 1; one or more network nodes, e.g., hubs, switches, routers, gateways, and so on; and one or more computing devices, e.g., computing device 200 of FIG. 2. In some implementations, the sending of the first notification involves the server assembling at least one network datagram, e.g., a frame, a packet, a message, and so on. In some implementations, the payload of the datagram(s) comprises the first notification. In some implementations, the payload of the datagram(s) comprises instructions that cause another computing device to assemble at least one datagram having a payload that comprises the first notification.

Figure 13:
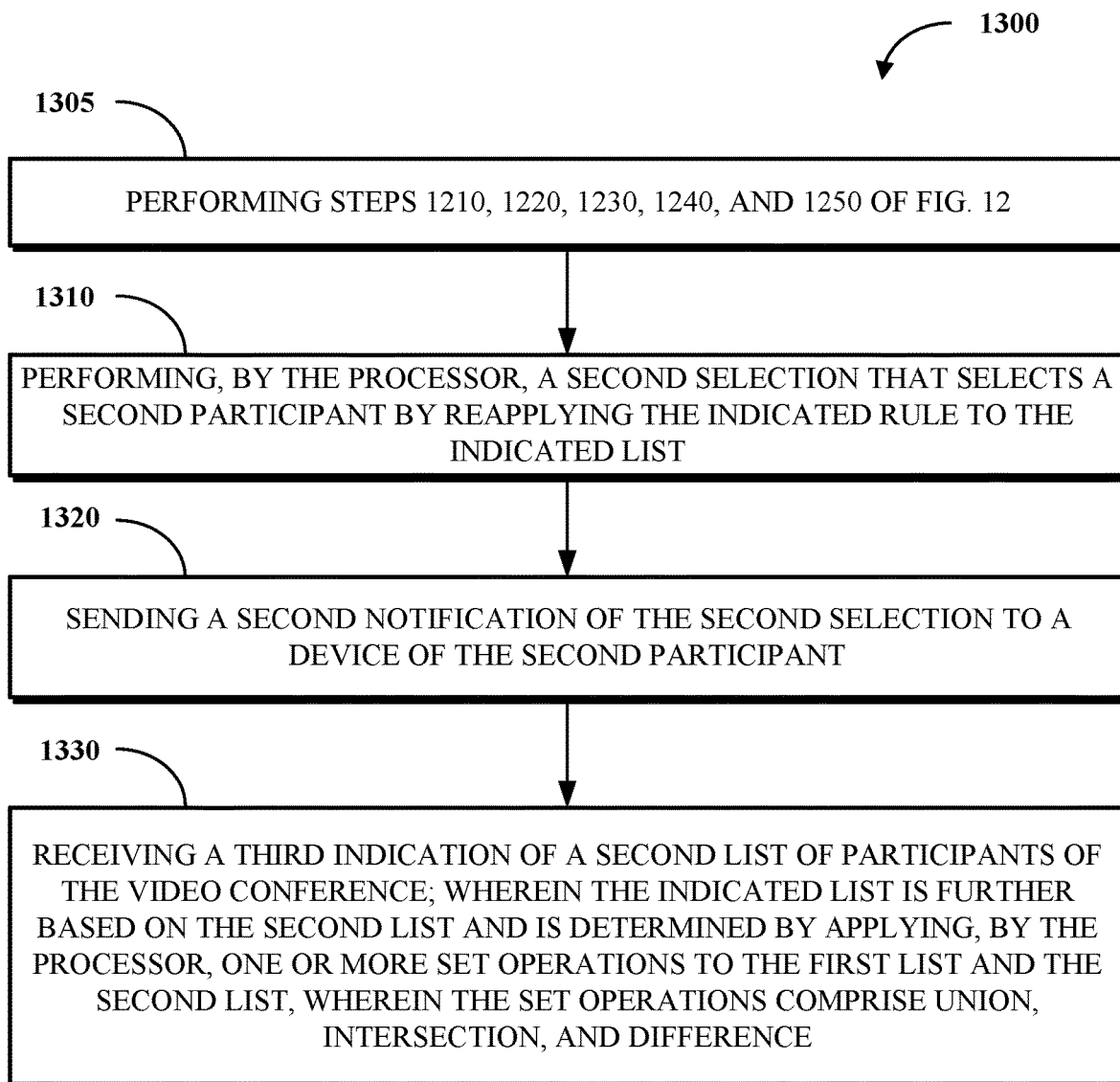
FIG. 13 is a flowchart of another example of a technique for dynamic selection of participants that may be implemented via one or more servers and/or one or more clients.

FIG. 13 is a flowchart of an example of a technique 1300 for dynamic selection of participants that may be implemented via one or more servers and/or one or more clients. The step 1305 comprises performing the steps 1210,1220, 1230, 1240, and 1250 of FIG. 12. The step 1310 comprises performing, by the processor, a second selection that selects a second participant by reapplying the indicated rule to the indicated list. "Reapplying" the indicated rule to the indicated list means applying the indicated rule to the indicated list while considering previous selections of participants during the currently active dynamic selection of participants. As an example, reapplying a "random selection without replacement" indicated rule to an indicated list would randomly select a participant from the indicated list exclusive of any previously selected participants under the indicated rule. As another example, reapplying a "random selection with replacement" indicated rule to an indicated list would randomly select a participant from the indicated list inclusive of any previously selected participants under the indicated rule. The processor may be coupled to a memory, e.g., the processor 202 coupled to the memory 204 of FIG. 2, each of which may be located in a client device, e.g., client devices 408 or 410 of FIG. 4; in a server, e.g., the application server 108, the database server 110, or the telephony server 112 of the datacenter 106 of FIG. 1; or a combination thereof. The processor may reapply the indicated rule to the indicated list via instructions executed thereon. Reapplication of the indicated rule to the indicated list may comprise sorting or filtering of the indicated list. For example, reapplication of a "random selection without replacement" indicated rule to an indicated list may comprise filtering the indicated list to exclude previously selected participants under the indicated rule prior to random selection.

The step 1320 comprises sending a second notification of the second selection to a device of the second participant. The first notification may be sent from a client device, e.g., client devices 408 or 410 of FIG. 4; or from a server, e.g., the application server 108, the database server 110, or the telephony server 112 of the datacenter 106 of FIG. 1. The second notification may be a suitable notification, for example, an indication indicating that the second participant has been selected; an indication instructing the second participant to enable video on the device of the second participant; or an indication instructing the second participant to enable audio on the device of the second participant. The device of the second participant may be a suitable computing device that is capable of receiving and processing the second notification, which may be a client device connected to the video conference or a device not connected to the video conference. As a first example, the second notification may be sent to a client device 408 or 410 connected to the video conference, which causes the client device to display a message via a graphical display (e.g., a user interface 212). As a second example, the second notification may be sent to a mobile phone that is not connected to the video conference, for example, as a text message.

The step 1330 comprises receiving a third indication of a second list of participants of the video conference; wherein the indicated list is further based on the second list and is determined by applying, by the processor, one or more set operations to the first list and the second list, wherein the set operations comprise union, intersection, and difference. The third indication may be received from one or more client devices, e.g., client devices 408 or 410 of FIG. 4; from one or more servers, e.g., the application server 108, the database server 110, or the telephony server 112 of the datacenter 106 of FIG. 1; or a combination thereof. The third indication may be an identification of the second list of participants that is stored in a server, e.g., in a memory 204, or acquired or generated thereby; the third indication may be the second list of participants that is stored in a client device, e.g., in a memory 204, or acquired or generated thereby; or the third indication may be a combination thereof. The one or more set operations (union, intersection, or difference) may be applied to the first list and the second list via instructions executed on the processor that may be coupled to a memory, e.g., computer instructions executed on the processor 202 coupled to the memory 204 of FIG. 2. As first example, the indicated list may be the union of the first list and the second list. As a second example, the indicated list may be the intersection of the first list and the second list. The one or more set operations may be indicated to the processor by a client device or by a server, or the one or more set operations may be determined by the processor in a suitable manner, for example, as one or more default operations. The second list may be a set or ordered set of participants based on suitable criteria, for example: whether video is enabled on a client device of the participant connected to the video conference; whether audio is enabled on a client device of the participant connected to the video conference; whether a hand-raised feature of the video conference is indicated for the participant; whether the participant has already been selected by application of the indicated rule to the indicated list; whether the participant's speaking during the video conference is below a predetermined participation threshold; whether a quality of a connection of a client device of the participant to the video conference exceeds a predetermined quality level; or whether the participant has performed a specified task outside the video conference.

Dynamic selection of participants can be implemented as a method, a non-transitory computer-readable medium, and a system. Further, dynamic selection of participants can be implemented by a client device, by a server device, or by a combination of client devices and server devices.

In an example implementation by a client device, a method comprises: receiving, by a first client device connected to a video conference, a first input indicating a first list of participants of the video conference; receiving, by the first client device, a second input indicating a rule for selecting participants from a list of participants; performing, by the first client device, a first selection of a first participant by applying an indicated rule to an indicated list, wherein the indicated rule is based on the rule and the indicated list is based on the first list; and sending, by the first client device, a first notification based on the first selection to a device of the first participant.

In some implementations, the device of the first participant is one of: a client device connected to the video conference; or a device not connected to the video conference.

In some implementations, the first notification comprises at least one of: an indication that the first participant was selected; an indication to enable video on the device of the first participant; or an indication to enable audio on the device of the first participant.

In some implementations, the method further comprises: performing, by the first client device, a second selection of a second participant by reapplying the indicated rule to the indicated list; sending, by the first client device, a second notification of the second selection to a device of the second participant; and displaying, by the first client device, a queue comprising the first participant and the second participant.

In some implementations, the rule is based on one of: a random selection with or without replacement; a forward or reverse alphabetical-order selection; a least- or most-talkative selection; a highest- or lowest-ranked selection; or a selection according to an order in an ordered list.

In some implementations, the method further comprises: receiving, by the first client device, a third input indicating a second list of participants of the video conference; wherein the indicated list is further based on the second list and is determined by applying, by the first client device, one or more set operations to the first list and the second list, wherein the set operations comprise union, intersection, and difference.

In some implementations, inclusion of a participant in the first list is based on one of: whether video is enabled on a client device of the participant connected to the video conference; whether audio is enabled on a client device of the participant connected to the video conference; whether a hand-raised feature of the video conference is indicated for the participant; whether the participant has already been selected by application of the indicated rule to the indicated list; whether the participant's speaking during the video conference is below a predetermined participation threshold; whether a quality of a connection of a client device of the participant to the video conference exceeds a predetermined quality level; or whether the participant has performed a specified task outside the video conference.

In some implementations, the method further comprises: receiving, by the first client device, a fourth input indicating a parameter of the rule; wherein the indicated rule is further based on the parameter and is determined by modifying the rule according to the parameter.

In some implementations, the method further comprises: receiving, by the first client device, a fifth input indicating a set operator; wherein the indicated list is further based on the set operator and is determined by applying, by the first client device, the set operator to the indicated list and the first list.

In some implementations, the method further comprises: receiving, by the first client device, a sixth input indicating a start function; wherein the performing of the first selection is responsive to a state of the start function.

In some implementations, the method further comprises: receiving, by the first client device, a seventh input indicating a next function; wherein the sending of the first notification is responsive to a state of the next function.

In another example implementation by a client device, a non-transitory computer-readable medium storing instructions operable to cause one or more processors to perform operations comprising: receiving, by a first client device connected to a video conference, a first input indicating a first list of participants of the video conference; receiving, by the first client device, a second input indicating a rule for selecting participants from a list of participants; performing, by the first client device, a first selection that selects a first participant by applying an indicated rule to an indicated list, wherein the indicated rule is based on the rule and the indicated list is based on the first list; and sending, by the first client device, a first notification based on the first selection to a device of the first participant.

In some implementations, the operations further comprise: receiving, by the first client device, a third input indicating whether to invert the first list; and in response to the third input indicating inversion, inverting the first list.

In some implementations, the operations further comprise: receiving, by the first client device, a fourth input indicating whether to add or remove a participant from the indicated list; in response to the fourth input indicating addition, adding the participant to the indicated list; and in response to the fourth input indicating removal, removing the participant from the indicated list.

In some implementations, the operations further comprise: after sending the first notification, causing a tile of the first participant to be spotlighted in the video conference.

In some implementations, the operations further comprise: after sending the first notification, causing a microphone of the device of the first participant to unmute, wherein the device of the first participant is a client device connected to the video conference.

In another example implementation by a client device, a system comprises: one or more memories and one or more processors configured to execute instructions stored in the one or more memories to: receive, by a first client device connected to a video conference, a first input indicating a first list of participants of the video conference; receive, by the first client device, a second input indicating a rule for selecting participants from a list of participants; perform, by the first client device, a first selection that selects a first participant by applying an indicated rule to an indicated list, wherein the indicated rule is based on the rule and the indicated list is based on the first list; and send, by the first client device, a first notification based on the first selection to a device of the first participant.

In some implementations, the instructions include instruction to: perform, by the first client device, a second selection that selects a second participant by reapplying the indicated rule to the indicated list; perform, by the first client device, a third selection that selects a third participant by reapplying the indicated rule to the indicated list; display, by the first client device, a queue comprising the second participant and the third participant; receive, by the first client device, a third input indicating a fourth selection of a next participant from the queue, wherein the next participant is one of the second participant or the third participant; and send, from the first client device, a second notification of the fourth selection to a device of the next participant.

In some implementations, the first list was created by a third-party application to the video conference.

In some implementations, the first notification comprises at least one of a text message or a phone call; and the device of the first participant is a mobile phone not connected to the video conference.

In an example implementation by a server, a method comprises: delivering, by a server, video conferencing services including a video conference; receiving, by the server, from a first client device connected to the video conference, a first indication of a first list of participants of the video conference; receiving, by the server, from the first client device, a second indication of a rule for selecting participants from a list of participants; performing, by the server, a first selection of a first participant by applying an indicated rule to an indicated list, wherein the indicated rule is based on the rule and the indicated list is based on the first list; and sending, by the server, a first notification based on the first selection to a device of the first participant.

In some implementations the device of the first participant is one of: a client device connected to the video conference; or a device not connected to the video conference.

In some implementations, the first notification comprises at least one of: an indication that the first participant was selected; an indication to enable video on the device of the first participant; or an indication to enable audio on the device of the first participant.

In some implementations, the method further comprises: performing, by the server, a second selection that selects a second participant by reapplying the indicated rule to the indicated list; and sending, by the server, a second notification of the second selection to a device of the second participant.

In some implementations, the rule is based on one of: a random selection with or without replacement; a forward or reverse alphabetical-order selection; a least- or most-talkative selection; a highest- or lowest-ranked selection; or a selection according to an order in an ordered list.

In some implementations, the method further comprises: receiving at the server, from the first client device, a third indication of a second list of participants of the video conference; wherein the indicated list is further based on the second list and is determined by applying, by the server, one or more set operations to the first list and the second list, wherein the set operations comprise union, intersection, and difference.

In some implementations, whether video is enabled on a client device of the participant connected to the video conference; whether audio is enabled on a client device of the participant connected to the video conference; whether a hand-raised feature of the video conference is indicated for the participant; whether the participant has already been selected by application of the indicated rule to the indicated list; whether the participant's speaking during the video conference is below a predetermined participation threshold; whether a quality of a connection of a client device of the participant to the video conference exceeds a predetermined quality level; or whether the participant has performed a specified task outside the video conference.

In some implementations, the method further comprises: receiving by the server, from the first client device, a fourth input indicating a parameter of the rule; wherein the indicated rule is further based on the parameter and is determined by modifying the rule according to the parameter.

In some implementations, the method further comprises: receiving, by the server, a fifth input indicating a set operator; wherein the indicated list is further based on the set operator and is determined by applying, by the server, the set operator to the indicated list and the first list.

In some implementations, the method further comprises: receiving, by the server, a sixth input indicating a start function; wherein the performing of the first selection is responsive to a state of the start function.

In some implementations, the method further comprises: receiving, by the server, a seventh input indicating a next function; wherein the sending of the first notification is responsive to a state of the next function.

In another example implementation via a server, a non-transitory computer-readable medium stores instructions operable to cause one or more processors to perform operations comprising: delivering, by a server, video conferencing services including a video conference; receiving by the server, from a first client device connected to the video conference, a first indication of a first list of participants of the video conference; receiving by the server, from the first client device, a second indication of a rule for selecting participants from a list of participants; performing, by the server, a first selection that selects a first participant by applying an indicated rule to an indicated list, wherein the indicated rule is based on the rule and the indicated list is based on the first list; and sending, by the server, a first notification based on the first selection to a device of the first participant.

In some implementations, the operations further comprise: receiving, by the server, a third input indicating whether to invert the first list; and in response to the third input indicating inversion, inverting the first list.

In some implementations, the operations further comprise: receiving, by the server, a fourth input indicating whether to add or remove a participant from the indicated list; in response to the fourth input indicating addition, adding the participant to the indicated list; and in response to the fourth input indicating removal, removing the participant from the indicated list.

In some implementations, the operations further comprise: after sending the first notification, causing a tile of the first participant to be spotlighted in the video conference.

In some implementations, the operations further comprise: after sending the first notification, causing a microphone of the device of the first participant to unmute, wherein the device of the first participant is a client device connected to the video conference.

In another example implementation via a server, a system comprises: one or more memories; and one or more processors configured to execute instructions stored in the one or more memories to: deliver, by a server, video conferencing services including a video conference; receive by the server, from a first client device connected to the video conference, a first indication of a first list of participants of the video conference; receive by the server, from the first client device, a second indication of a rule for selecting participants from a list of participants; perform, by the server, a first selection that selects a first participant by applying an indicated rule to an indicated list, wherein the indicated rule is based on the rule and the indicated list is based on the first list; and send, by the server, a first notification based on the first selection to a device of the first participant.

In some implementations, the instructions include instructions to: perform, by the server, a second selection that selects a second participant by reapplying the indicated rule to the indicated list; perform, by the server, a third selection that selects a third participant by reapplying the indicated rule to the indicated list; cause a queue comprising the second participant and the third participant to be displayed by the first client device; receive by the server, from the first client device, a third input indicating a fourth selection of a next participant from the queue, wherein the next participant is one of the second participant or the third participant; and send, by the server, a second notification of the fourth selection to a device of the next participant.

In some implementations, the first list was created by a third-party application to the video conference.

In some implementations, the first notification comprises at least one of a text message or a phone call; and the device of the first participant is a mobile phone not connected to the video conference.

In an example implementation by one or more client devices and one or more servers, a method comprises: delivering video conferencing services including a video conference; receiving a first indication of a first list of participants of the video conference; receiving a second indication of a rule for selecting participants from a list of participants; performing, by a processor, a first selection of a first participant by applying an indicated rule to an indicated list, wherein the indicated rule is based on the rule and the indicated list is based on the first list; and sending a first notification based on the first selection to a device of the first participant.

In some implementations, the device of the first participant is one of: a client device connected to the video conference; or a device not connected to the video conference.

In some implementations, the first notification comprises at least one of: an indication that the first participant was selected; an indication to enable video on the device of the first participant; or an indication to enable audio on the device of the first participant.

In some implementations, the method further comprises: performing, by the processor, a second selection that selects a second participant by reapplying the indicated rule to the indicated list; and sending a second notification of the second selection to a device of the second participant.

In some implementations, the rule is based on one of: a random selection with or without replacement; a forward or reverse alphabetical-order selection; a least- or most-talkative selection; a highest- or lowest-ranked selection; or a selection according to an order in an ordered list.

In some implementations, the method further comprises: receiving a third indication of a second list of participants of the video conference; wherein the indicated list is further based on the second list and is determined by applying, by the processor, one or more set operations to the first list and the second list, wherein the set operations comprise union, intersection, and difference.

In some implementations, inclusion of a participant in the first list is based on one of: whether video is enabled on a client device of the participant connected to the video conference; whether audio is enabled on a client device of the participant connected to the video conference; whether a hand-raised feature of the video conference is indicated for the participant; whether the participant has already been selected by application of the indicated rule to the indicated list; whether the participant's speaking during the video conference is below a predetermined participation threshold; whether a quality of a connection of a client device of the participant to the video conference exceeds a predetermined quality level; or whether the participant has performed a specified task outside the video conference.

In some implementations, the method further comprises: receiving a fourth input indicating a parameter of the rule; wherein the indicated rule is further based on the parameter and is determined by modifying the rule according to the parameter.

In some implementations, the method further comprises: receiving a fifth input indicating a set operator; wherein the indicated list is further based on the set operator and is determined by applying the set operator to the indicated list and the first list.

In some implementations, the method further comprises: receiving a sixth input indicating a start function; wherein the performing of the first selection is responsive to a state of the start function.

In some implementations, the method further comprises: receiving a seventh input indicating a next function; wherein the sending of the first notification is responsive to a state of the next function.

In another example implementation by one or more client devices and one or more servers, a method comprises: a non-transitory computer-readable medium stores instructions operable to cause one or more processors to perform operations comprising: delivering video conferencing services including a video conference; receiving a first indication of a first list of participants of the video conference; receiving a second indication of a rule for selecting participants from a list of participants; performing, by a processor, a first selection that selects a first participant by applying an indicated rule to an indicated list, wherein the indicated rule is based on the rule and the indicated list is based on the first list; and sending a first notification based on the first selection to a device of the first participant.

In some implementations, the operations further comprise: receiving a third input indicating whether to invert the first list; and in response to the third input indicating inversion, inverting the first list.

In some implementations, the operations further comprise: receiving a fourth input indicating whether to add or remove a participant from the indicated list; in response to the fourth input indicating addition, adding the participant to the indicated list; and in response to the fourth input indicating removal, removing the participant from the indicated list.

In some implementations, the operations further comprise: after sending the first notification, causing a tile of the first participant to be spotlighted in the video conference.

In some implementations, the operations further comprise: after sending the first notification, causing a microphone of the device of the first participant to unmute, wherein the device of the first participant is a client device connected to the video conference.

In another example implementation via one or more client devices and one or more servers, a system, comprises: one or more memories; and one or more processors configured to execute instructions stored in the one or more memories to: deliver video conferencing services including a video conference; receive a first indication of a first list of participants of the video conference; receive a second indication of a rule for selecting participants from a list of participants; perform, by a processor, a first selection that selects a first participant by applying an indicated rule to an indicated list, wherein the indicated rule is based on the rule and the indicated list is based on the first list; and send a first notification based on the first selection to a device of the first participant.

In some implementations, the instruction include instructions to: perform, by the processor, a second selection that selects a second participant by reapplying the indicated rule to the indicated list; perform, by the processor, a third selection that selects a third participant by reapplying the indicated rule to the indicated list; cause a queue comprising the second participant and the third participant to be displayed by the first client device; receive, from the first client device, a third input indicating a fourth selection of a next participant from the queue, wherein the next participant is one of the second participant or the third participant; and send a second notification of the fourth selection to a device of the next participant.

In some implementations, the first list was created by a third-party application to the video conference.

In some implementations, the first notification comprises at least one of a text message or a phone call; and the device of the first participant is a mobile phone not connected to the video conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   delivering, by a server, video conferencing services including a video conference;
   causing, by the server, a host client device connected to the video conference to display a graphical user interface comprising a plurality of user-selectable lists of participants of the video conference and a plurality of user-selectable rules for determining a queue comprising a plurality of participants from a first list of the plurality of user-selectable lists of participants;
   receiving, by the server, from the host client device, a selection of the first list;
   receiving, by the server, from the host client device, a selection of a rule from the plurality of user-selectable rules;
   receiving, by the server, from the host client device, an indication indicating a parameter of the rule, wherein the host client device is further configured to enable a host to dynamically modify the parameter of the rule via the graphical user interface, and the server modifies the queue dynamically in response to the modifying of the parameter;
   determining, by the server, a modified rule by modifying the rule according to the parameter;
   determining, by the server, the queue by applying the modified rule to an indicated list that is based on the first list, wherein applying the modified rule to the indicated list comprises at least one of sorting or filtering of the indicated list;
   causing, by the server, a first participant at a first position of the queue to become a current speaker;
   assembling and sending, by the server, a first network datagram to a first device of the first participant, the first network datagram comprising a first notification indicating the first participant is the current speaker and having a payload comprising instructions to enable at least one of audio or video on the first device or to cause the first device to present a prompt to turn on at least one of audio or video;
   causing, by the server, a second participant at a second position of the queue to become the current speaker of the video conference after a termination of the first participant as the current speaker; and
   assembling and sending, by the server, a second network datagram to a second device of the second participant, the second network datagram comprising a second notification indicating the second participant is the current speaker and having a payload comprising instructions to enable at least one of audio or video on the second device or to cause the second device to present a prompt to turn on at least one of audio or video.

2. The method of claim 1, wherein the first device of the first participant is:
a device not connected to the video conference.

3. The method of claim 1, wherein:
the first position is a #1 position of the queue.

4. The method of claim 1, wherein the rule is based on one of:
a random selection with or without replacement;
a forward or reverse alphabetical-order selection;
a least- or most-talkative selection;
a highest- or lowest-ranked selection; or
a selection according to an order in an ordered list.

5. The method of claim 1, further comprising:
receiving, by the server, from the host client device, an indication of a second list of participants of the video conference; wherein
the indicated list is further based on the second list of participants and is determined by applying, by the server, one or more set operations to the first list and the second list of participants, wherein the one or more set operations comprise union, intersection, and difference.

6. The method of claim 1, wherein inclusion of a participant in the first list is based on one of:
whether video is enabled on a client device of the participant connected to the video conference;
whether audio is enabled on the client device of the participant connected to the video conference;
whether a hand-raised feature of the video conference is indicated for the participant;
whether the participant's speaking during the video conference is below a predetermined participation threshold;
whether a quality of a connection of the client device of the participant to the video conference exceeds a predetermined quality level; or
whether the participant has performed a specified task outside the video conference.

7. The method of claim 1, further comprising:
receiving, by the server, from the host client device, an indication indicating a set operator; wherein
the indicated list is further based on the set operator and is determined by applying, by the server, the set operator to the indicated list and the first list.

8. The method of claim 1, wherein:
the first position of the queue and the second position of the queue are not contiguous, the method further comprising:
receiving, by the server, from the host client device, an indication to skip a participant at a position of the queue between the first position and the second position from becoming the current speaker.

9. The method of claim 1, wherein the termination comprises:
receiving, by the server, from the host client device, an indication indicating a "Go To Next" speaker function.

10. A non-transitory computer-readable medium storing instructions operable to cause one or more processors to perform operations comprising:
delivering, by a server, video conferencing services including a video conference;
causing, by the server, a host client device connected to the video conference to display a graphical user interface comprising a plurality of user-selectable lists of participants of the video conference and a plurality of user-selectable rules for determining a queue comprising a plurality of participants from a first list of the plurality of user-selectable lists of participants;
receiving, by the server, from the host client device, a selection of the first list;
receiving, by the server, from the host client device, a selection of a rule from the plurality of user-selectable rules;
receiving, by the server, from the host client device, an indication indicating a parameter of the rule, wherein the host client device is further configured to enable a host to dynamically modify the parameter of the rule via the graphical user interface, and the server modifies the queue dynamically in response to the modifying of the parameter;
determining, by the server, a modified rule by modifying the rule according to the parameter;
determining, by the server, the queue by applying the modified rule to an indicated list that is based on the first list, wherein applying the modified rule to the indicated list comprises at least one of sorting or filtering of the indicated list;
causing, by the server, a first participant at a first position of the queue to become a current speaker;
assembling and sending, by the server, a first network datagram to a first device of the first participant, the first network datagram comprising a first notification indicating the first participant is the current speaker and having a payload comprising instructions to enable at least one of audio or video on the first device or to cause the first device to present a prompt to turn on at least one of audio or video;
causing, by the server, a second participant at a second position of the queue to become the current speaker of the video conference after a termination of the first participant as the current speaker; and
assembling and sending, by the server, a second network datagram to a second device of the second participant, the second network datagram comprising a second notification indicating the second participant is the current speaker and having a payload comprising instructions to enable at least one of audio or video on the second device or to cause the second device to present a prompt to turn on at least one of audio or video.

11. The non-transitory computer-readable medium of claim 10, the operations further comprising:
receiving, by the server, an indication indicating whether to invert the first list; and
in response to the indication, inverting the first list.

12. The non-transitory computer-readable medium of claim 10, the operations further comprising:
receiving, by the server, an indication indicating whether to add or remove a participant from the indicated list;
in response to the indication indicating addition, adding the participant to the indicated list; and
in response to the indication indicating removal, removing the participant from the indicated list.

13. The non-transitory computer-readable medium of claim 10, the operations further comprising:
after sending the first notification, causing a tile of the first participant to be spotlighted in the video conference.

14. The non-transitory computer-readable medium of claim 10, the operations further comprising:
after sending the first notification, causing a microphone of the first device to unmute, wherein the first device is a client device connected to the video conference.

15. A system, comprising:

one or more memories; and one or more processors configured to execute instructions stored in the one or more memories to:

deliver, by a server, video conferencing services including a video conference;

cause, by the server, a host client device connected to the video conference to display a graphical user interface comprising a plurality of user-selectable lists of participants of the video conference and a plurality of user-selectable rules for determining a queue comprising a plurality of participants from a first list of the plurality of user-selectable lists of participants;

receive, by the server, from the host client device, a selection of the first list;

receive, by the server, from the host client device, a selection of a rule from the plurality of user-selectable rules;

receive, by the server, from the host client device, an indication indicating a parameter of the rule, wherein the host client device is further configured to enable a host to dynamically modify the parameter of the rule via the graphical user interface, and the server modifies the queue dynamically in response to the modifying of the parameter;

determine, by the server, a modified rule by modifying the rule according to the parameter;

determine, by the server, the queue by applying the modified rule to an indicated list that is based on the first list, wherein applying the modified rule to the indicated list comprises at least one of sorting or filtering of the indicated list;

cause, by the server, a first participant at a first position of the queue to become a current speaker;

assemble and send, by the server, a first network datagram to a first device of the first participant, the first network datagram comprising a first notification indicating the first participant is the current speaker and having a payload comprising instructions to enable at least one of audio or video on the first device or to cause the first device to present a prompt to turn on at least one of audio or video;

cause, by the server, a second participant at a second position of the queue to become the current speaker of the video conference after a termination of the first participant as the current speaker; and assemble and send, by the server, a second network datagram to a second device of the second participant, the second network datagram comprising a second notification indicating the second participant is the current speaker and having a payload comprising instructions to enable at least one of audio or video on the second device or to cause the second device to present a prompt to turn on at least one of audio or video.

16. The system of claim 15, wherein the instructions include instructions to:

cause the queue to be displayed by the host client device.

17. The system of claim 15, wherein:

the first list was created by a third-party application to the video conference.

18. The system of claim 15, wherein:

the first notification comprises at least one of a text message or a phone call; and the first device is a mobile phone not connected to the video conference.

* * * * *